US011033003B1

(12) United States Patent
Burkhardt

(10) Patent No.: US 11,033,003 B1
(45) Date of Patent: Jun. 15, 2021

(54) RETRACTABLE LEASH DEVICE AND METHOD THEREFOR

(71) Applicant: George Wayne Burkhardt, San Antonio, TX (US)

(72) Inventor: George Wayne Burkhardt, San Antonio, TX (US)

( * ) Notice: Subject to any disclaimer, the term of this patent is extended or adjusted under 35 U.S.C. 154(b) by 0 days.

(21) Appl. No.: 16/656,730

(22) Filed: Oct. 18, 2019

Related U.S. Application Data

(60) Provisional application No. 62/748,510, filed on Oct. 21, 2018.

(51) Int. Cl.
| | |
|---|---|
| *A01K 27/00* | (2006.01) |
| *B65H 75/40* | (2006.01) |
| *B65H 75/44* | (2006.01) |
| *B65H 75/48* | (2006.01) |

(52) U.S. Cl.
CPC ......... *A01K 27/004* (2013.01); *B65H 75/406* (2013.01); *B65H 75/4436* (2013.01); *B65H 75/486* (2013.01)

(58) Field of Classification Search
CPC ...... A01K 27/004; A01K 27/003; A01K 1/04; A01K 27/005; A01K 27/00; A01K 27/009; A01K 27/001; B65H 75/48; B65H 75/4471; B65H 75/4431; B65H 75/4428; B65H 2701/35; B65H 75/4418; B65H 75/4442; B65H 75/4426; B65H 75/4423

USPC ..... 119/795, 794, 796, 797, 792; 242/384.7, 242/382, 385.4, 396.4, 376, 396.6
See application file for complete search history.

(56) References Cited

U.S. PATENT DOCUMENTS

| | | | |
|---|---|---|---|
| 6,904,872 B2 | 6/2005 | Muller | |
| 7,896,281 B2 | 3/2011 | Bleshoy | |
| 8,151,736 B2 | 4/2012 | Simpson | |
| 9,480,241 B2 | 11/2016 | Holmstrom | |
| 2004/0237907 A1* | 12/2004 | Muller | A01K 27/004 119/796 |
| 2010/0107992 A1* | 5/2010 | Chefetz | A01K 27/004 119/796 |
| 2016/0338323 A1* | 11/2016 | Nishida | A01K 27/004 |
| 2017/0142935 A1 | 5/2017 | Max | |
| 2018/0027775 A1* | 2/2018 | Smith | B65H 75/4431 |

* cited by examiner

*Primary Examiner* — Peter M Poon
*Assistant Examiner* — Jeffrey R Larsen

(57) ABSTRACT

A retractable leash device for animal control is disclosed, having a multitude of settable maximum leash line extensions providing leash line retraction at each set extension length. The device includes a leash line connectable to an animal, a housing having an axle and an outlet aperture, a reel having a hub and mounted on the axle, a reel biasing spring to retract the leash line, a maximum extension brake having an arresting member and a brake control. The leash line is wound on the reel and exits the housing through the aperture. The arresting member crosses the leash line thereinbetween the hub and the aperture. Upon engagement of the brake therewith the reel and extension of the leash line, an eventual interaction of the arresting member therewith the leash line prevents further extension of the leash line. The brake control engages and disengages the brake with respect to the reel.

20 Claims, 18 Drawing Sheets

RETRACTABLE LEASH DEVICE AND METHOD THEREFOR

CROSS-REFERENCE TO RELATED APPLICATIONS

This application claims the benefit of U.S. Provisional Patent Application Ser. No. 62/748,510, filed Oct. 21, 2018 by the present inventor.

FEDERALLY SPONSORED RESEARCH

None.

SEQUENCE LISTING

None.

BACKGROUND

Field of Invention

This application relates to a retractable leash device and method therefor and more specifically, to a retractable leash device and method therefor that can be set to various lengths of maximum leash line extensions and when set at a maximum extension length, complete leash line retraction and extension is enabled.

Prior Art

In order to maintain an animal, such as a dog, at a safe distance from its keeper, a hand held leash is normally employed and coupled to the animal via a collar, harness, an animal restraint device and the like. In the event that a leash having various leash line lengths is desired, a retractable leash is used having a spring biased reel serving to enable retraction and extension of the leash line thereon as a function of leash line tension. When the animal is about to move beyond a safe distance, its keeper can prevent further leash line extension by enabling a reel brake which disables rotation of the reel and therefore, further extension of the leash line. When the reel brake has been enabled, the animal can move only between its keeper and that portion of the leash line previously extended however, leash line retraction is disenabled. When the reel brake is disengaged, leash line extension and retraction are resumed.

On conventional retractable leashes, the reel brake is usually a momentary push button on-off brake in which the button can be locked in an on position. Usually, the related button can be quickly pushed in to enable the brake and stop the further extension of the leash line to keep the tethered animal at a safe distance from its keeper and released to disable the brake when the animal is well within a safe distance. As an alternative, the button can be pressed in and locked to continually enable the brake when the extended leash line length will keep the tethered animal within a safe distance for a longer period of time. As long as the brake is enabled, either momentary or locked, further leash line extension and retraction are disabled.

However, the conventional retractable leashes present an annoying and possibly dangerous problem in that when the brake is engaged, retraction of the leash line is disabled. As a result, when the tethered animal comes closer to its keeper, the leash line will become slack and drag the ground thereby, becoming highly susceptible to being entangled in the animals legs and/or in other adjacent objects, such as plants, structures, equipment, etc. When this entanglement occurs, the keeper has to stop, bend over and undo the entanglement.

Upon walking an animal, its keeper has to decide whether to use the momentary brake as needed or lock the brake at a certain leash line extension length. If the momentary brake is used as needed, the keeper has to continually watch the animal and enable and disable the momentary brake in order to keep the animal at a safe distance to maintain leash line retraction tension so as to reduce the tendency for entanglement. If the keeper choses to lock the brake at a fixed leash line length, then leash line retraction is disabled and the tendency for leash line entanglement is significantly increased.

More importantly, when using these retractable leashes, the operator or keeper is warned to not touch or hold onto the leash line when in use, as serious injury can happen. However, when the brake is locked, people sometimes do not heed to this warning and hand hold the leash line to eliminate slack in the line thereby, keeping the line from touching the ground and/or becoming entangled. In cases, the animal can suddenly bolt away from its keeper thus, abruptly over tensioning the line resulting in a hand being seriously injured with the possibility of finger(s) being pulled off. I other cases, serious leg burns can result from an untensioned leash line being abruptly pulled against a person's leg.

In an attempt to overcome the problem of being in a non-retractable state when the brake is locked at a fixed leash line extension length, several retractable leashes have been developed; however, they all suffer from a number of deficiencies and drawbacks.

As examples, U.S. Pat. No. 7,896,281 issued Mar. 1, 2011 to Ernst-Peter Bleshoy; U.S. Pat. No. 8,151,736 issued Apr. 10, 2012 to Terence Earl Simpson, Mark Horton Radford and Michael Howard Boudreau; U.S. Pat. No. 9,480,241 issued Nov. 1, 2016 to Eric James Holmstrom; and U.S. Pat. No. 6,904,872 issued Jun. 14, 2005 to Roland Muller can all retract the leash line when the leash line is set to a maximum leash line extension length. However, in order to accomplish this capability, all of these retractable leashes have complicated mechanisms with a multitude of components including gear reduction assemblies, levers, complex linkage assemblies and/or involved screw assemblies, etc. which are used to mechanically coordinate reel rotation with a brake assembly, which thereby, significantly increases the size, weight, expense, complexity and opportunities for failure of these handheld retractable leash devices.

In view of the deficiencies and drawbacks of these retractable leashes, there continues to remain a need in the art for an inexpensive, easy-to-use, user friendly, simple and reliable retractable leash which provides for repeatable complete leash line extension and retraction upon establishing a user settable leash line maximum extension length wherein: (1) the leash line can be easily set to a multitude of different fixed leash line maximum extension lengths, (2) a momentary brake is provided, (3) the part count as compared to related conventional retractable leashes is minimal and (4) no reduction gearing, complicated linkage and/or complex part assemblies are required.

SUMMARY

In accordance with one embodiment of the present invention, a retractable leash device for control of an animal is disclosed, having a multitude of settable maximum leash extensions therefrom the device while providing complete leash retraction thereinto the device at each set maximum leash extension length. The retractable leash device includes a leash line, a reel, a housing, an axle, a spring, a maximum extension brake and a maximum extension brake control. The reel includes at least one sidewall and a hub affixed thereto the at least one sidewall; the housing includes a leash line outlet aperture; and the maximum extension brake includes a leash line arresting member. The leash line is wound, in part, on the reel about the hub and exits the housing through the aperture. The leash line is operable to connect to the animal. The reel is mounted therewithin the housing on the axle and biased by the spring to retract the leash line thereon the reel. The maximum extension brake is positioned adjacent to the reel and engageable therewith the reel wherein the leash line arresting member, at least in part, crosses the leash line therein between the hub and the aperture and further, upon engagement of the brake therewith the reel and extension of the leash line, an eventual interaction of the leash line arresting member therewith the leash line prevents further extension of the leash line. The maximum extension brake control has an internal portion and an external portion, the internal portion is engageable therewith the brake to moveably position the brake thereinto engagement therewith and disengagement therefrom the reel upon operator interaction of the external portion of the brake control. The operator of the retractable leash device can then set the device to a multitude of leash maximum extension lengths, as determined by the length of the leash line extended therefrom the reel upon engagement of the brake therewith the reel, and provide complete leash line retraction and extension at each set maximum extension length, thereby enhancing control of the animal.

It is the object of the embodiments disclosed herein to solve at least some of the afore mentioned problems inherent in the prior art.

BRIEF DESCRIPTION OF THE DRAWING FIGURES

A better understanding of the embodiments of the retractable leash device and method therefor may be had by reference to the drawing figures wherein.

Figure 12:
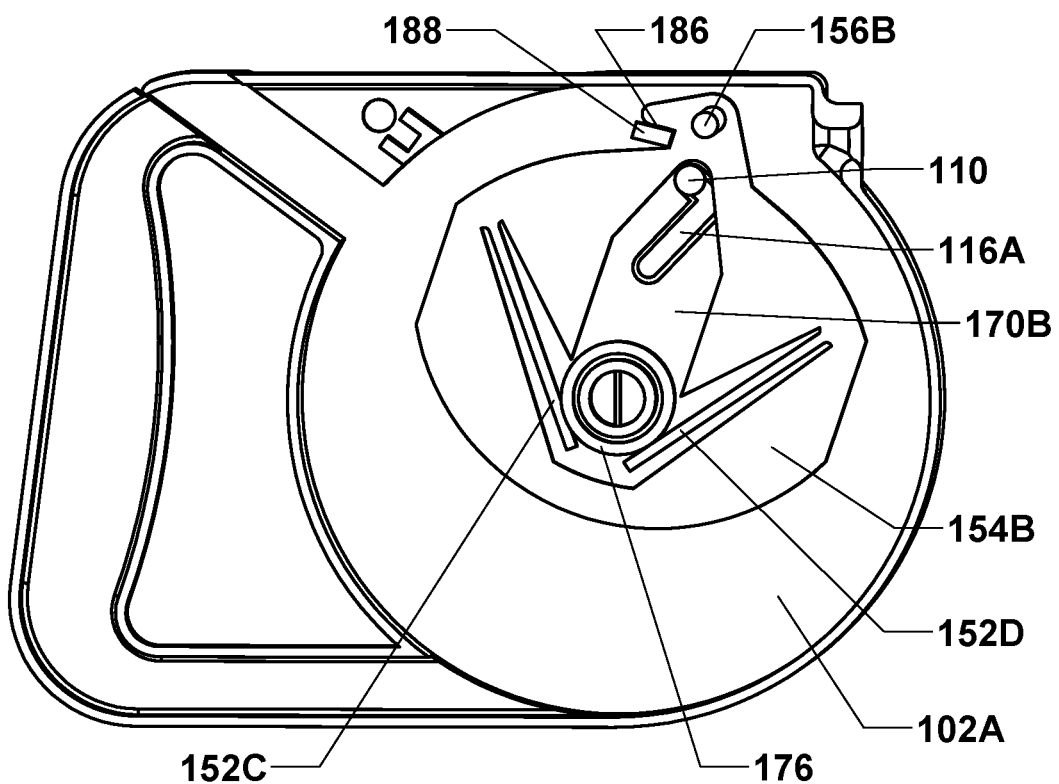
Figure 13:
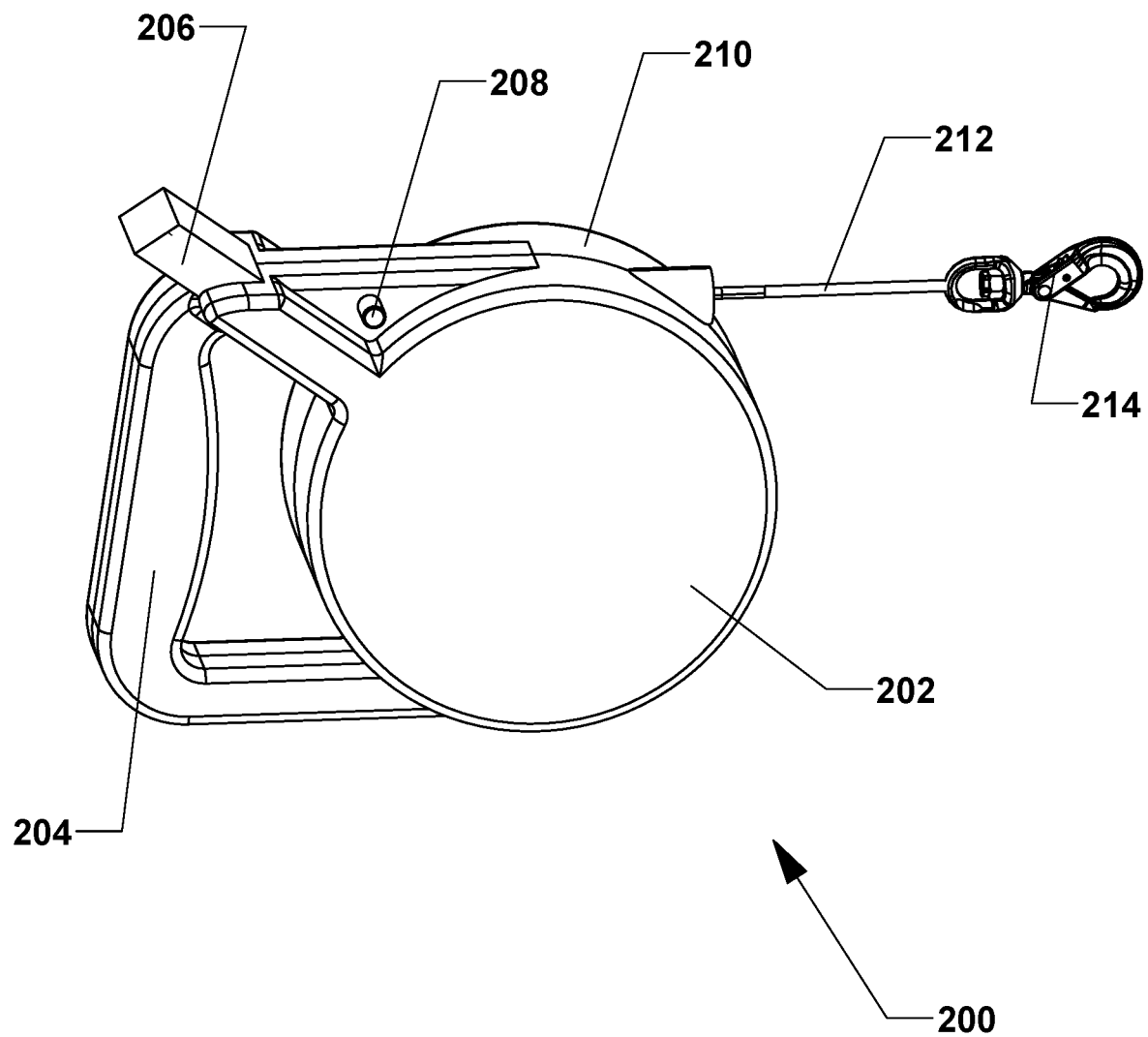
Figure 14:
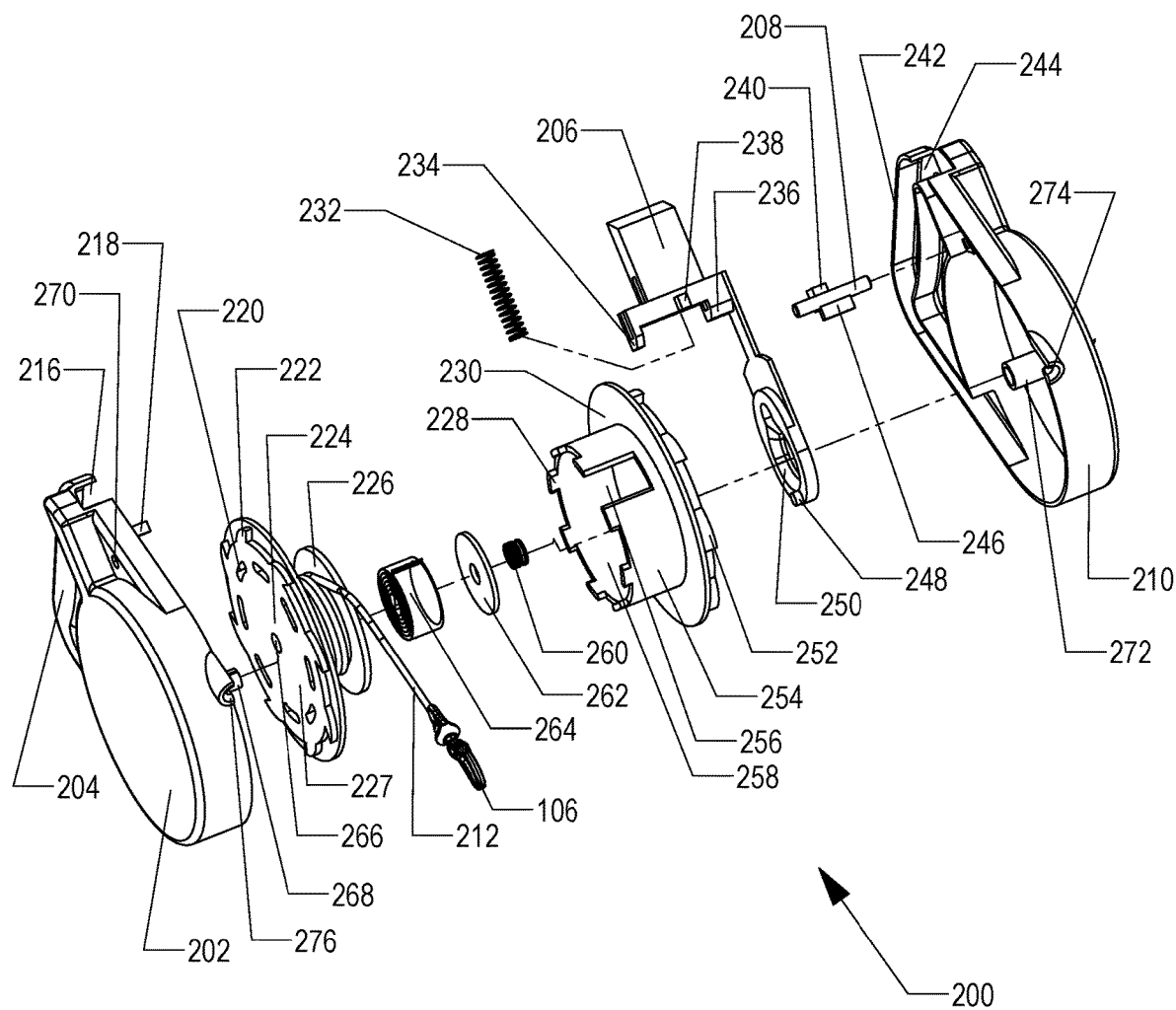
Figure 15:
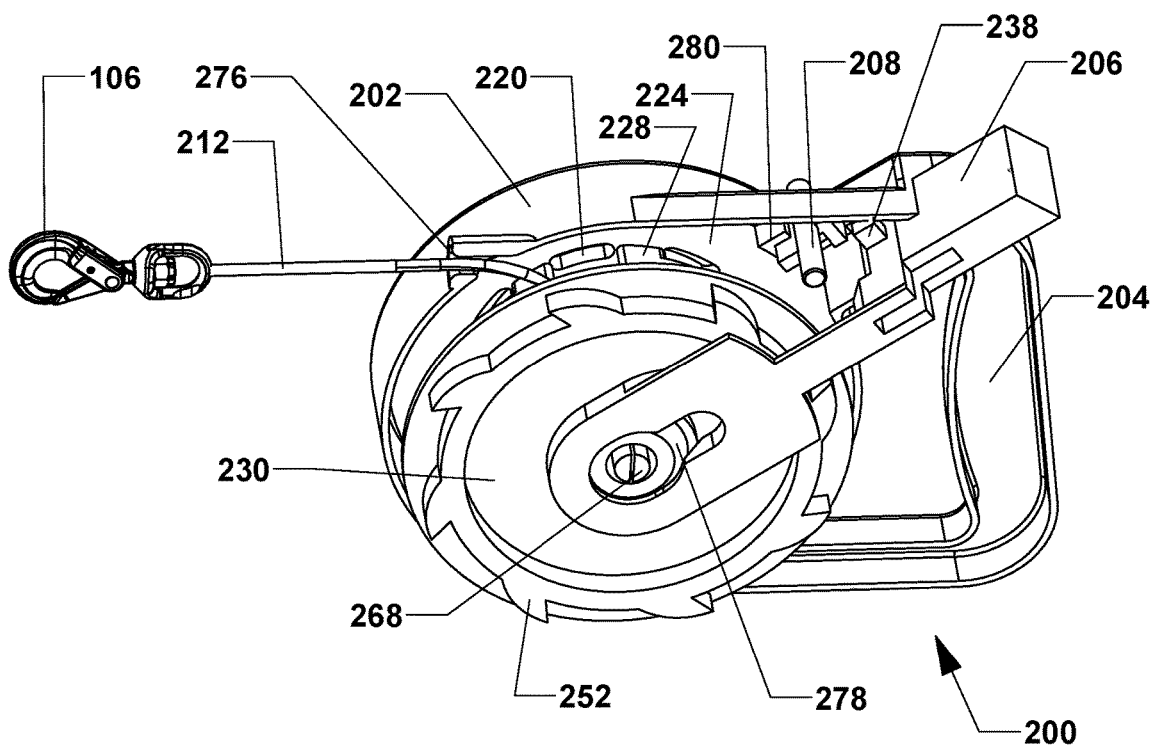
Figure 16:
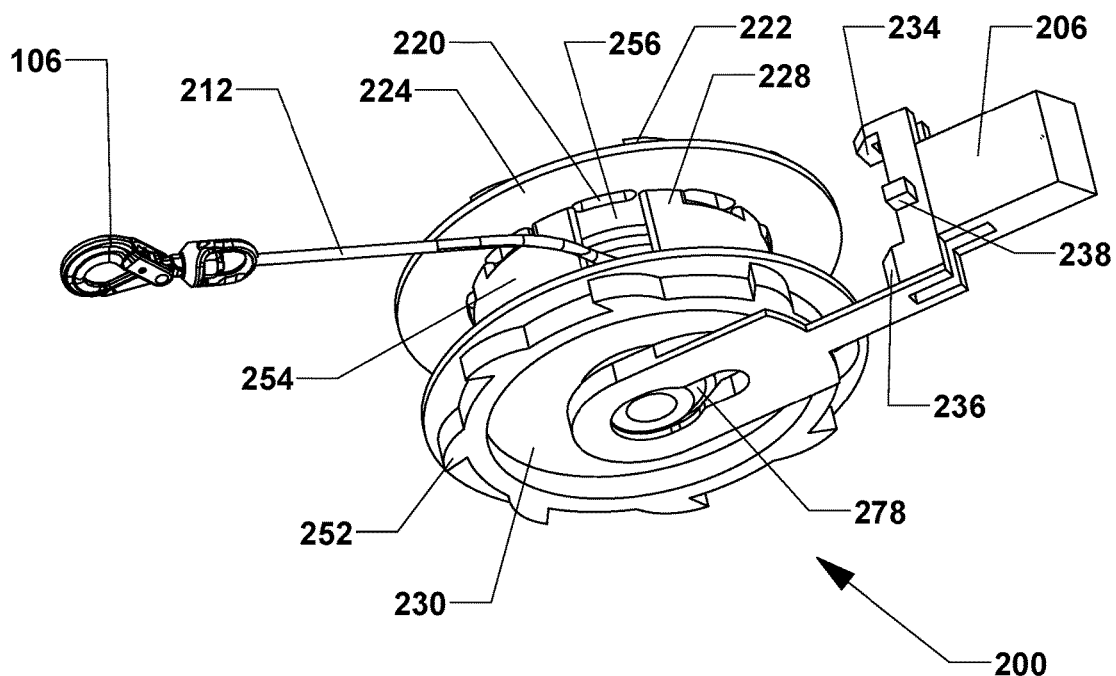
Figure 17:
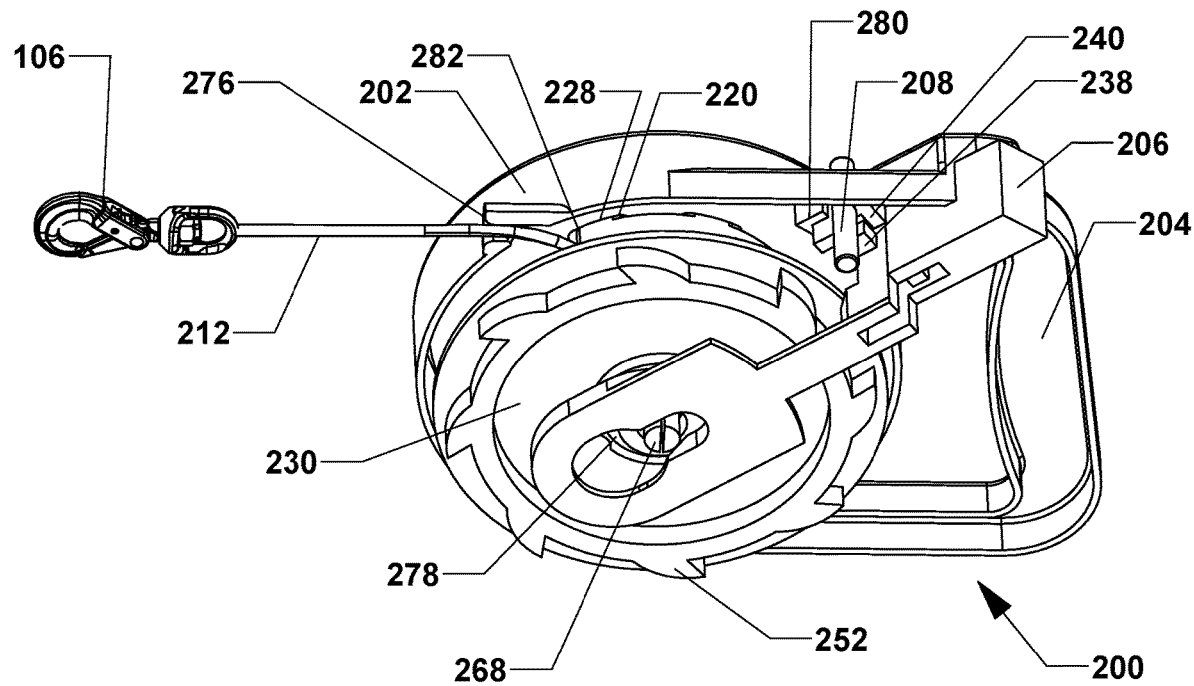
Figure 18:
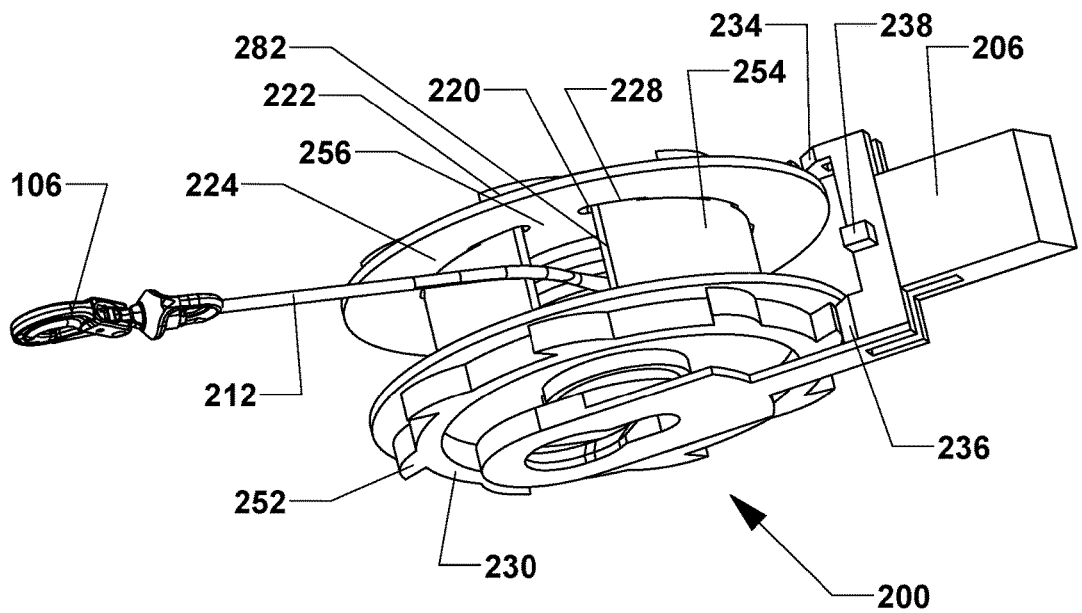
Figure 19:
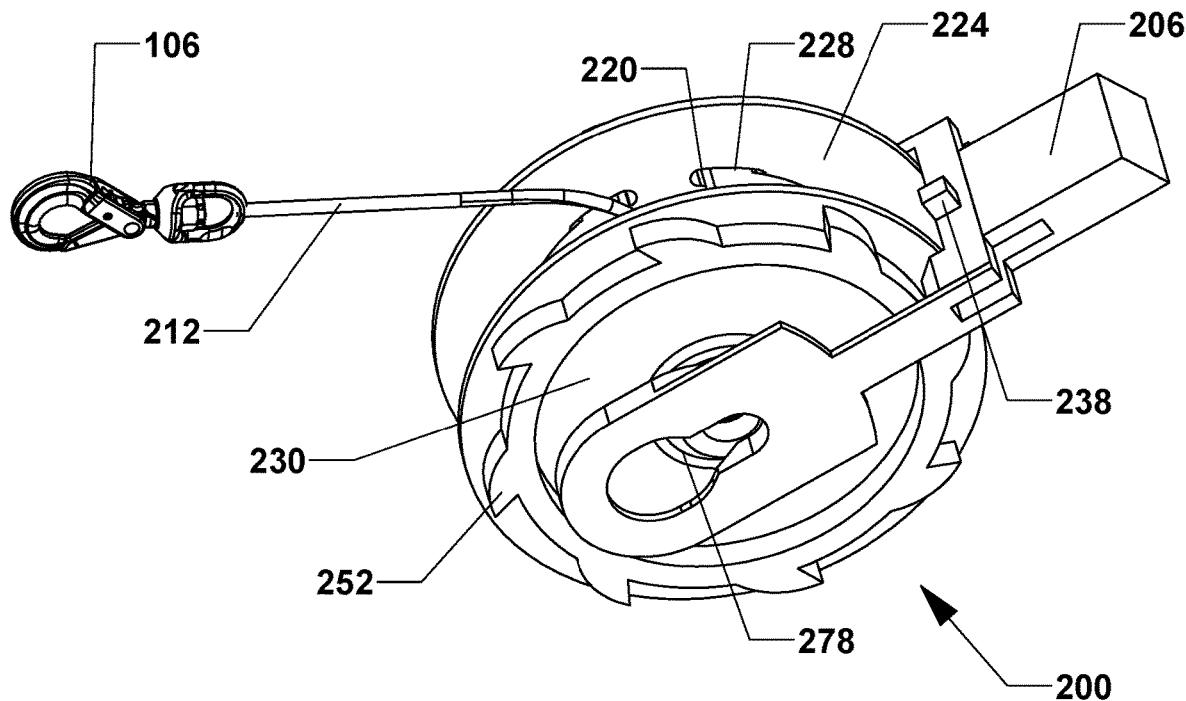
Figure 20:
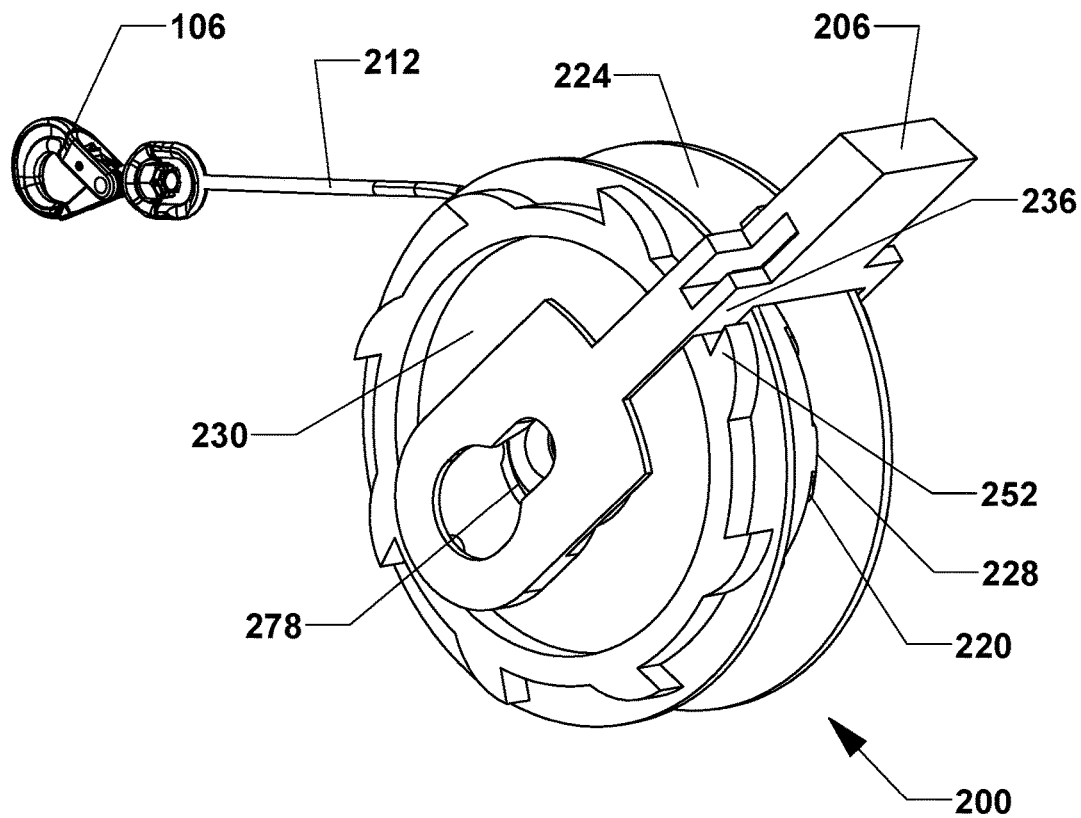
Figure 21:
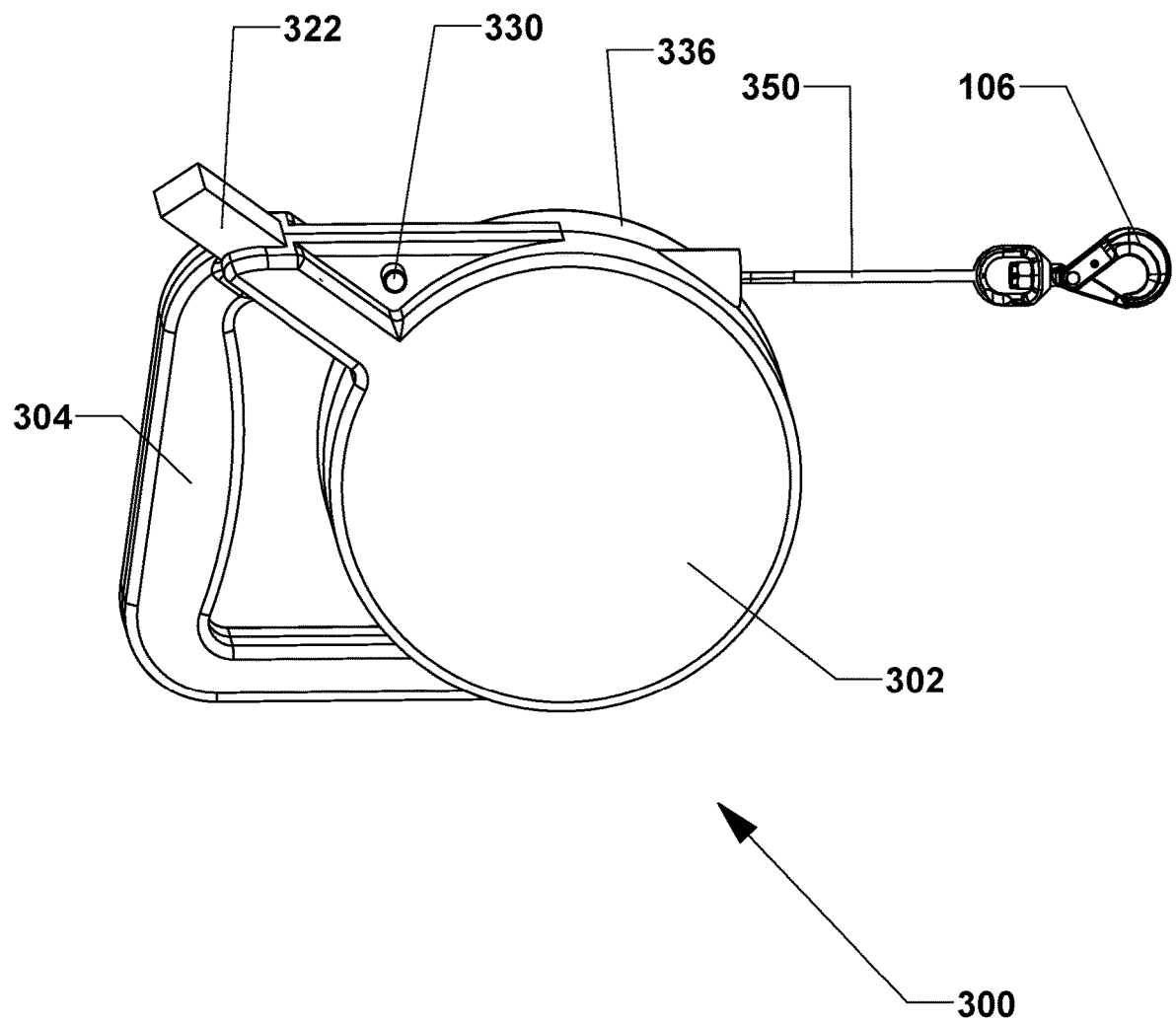
Figure 22:
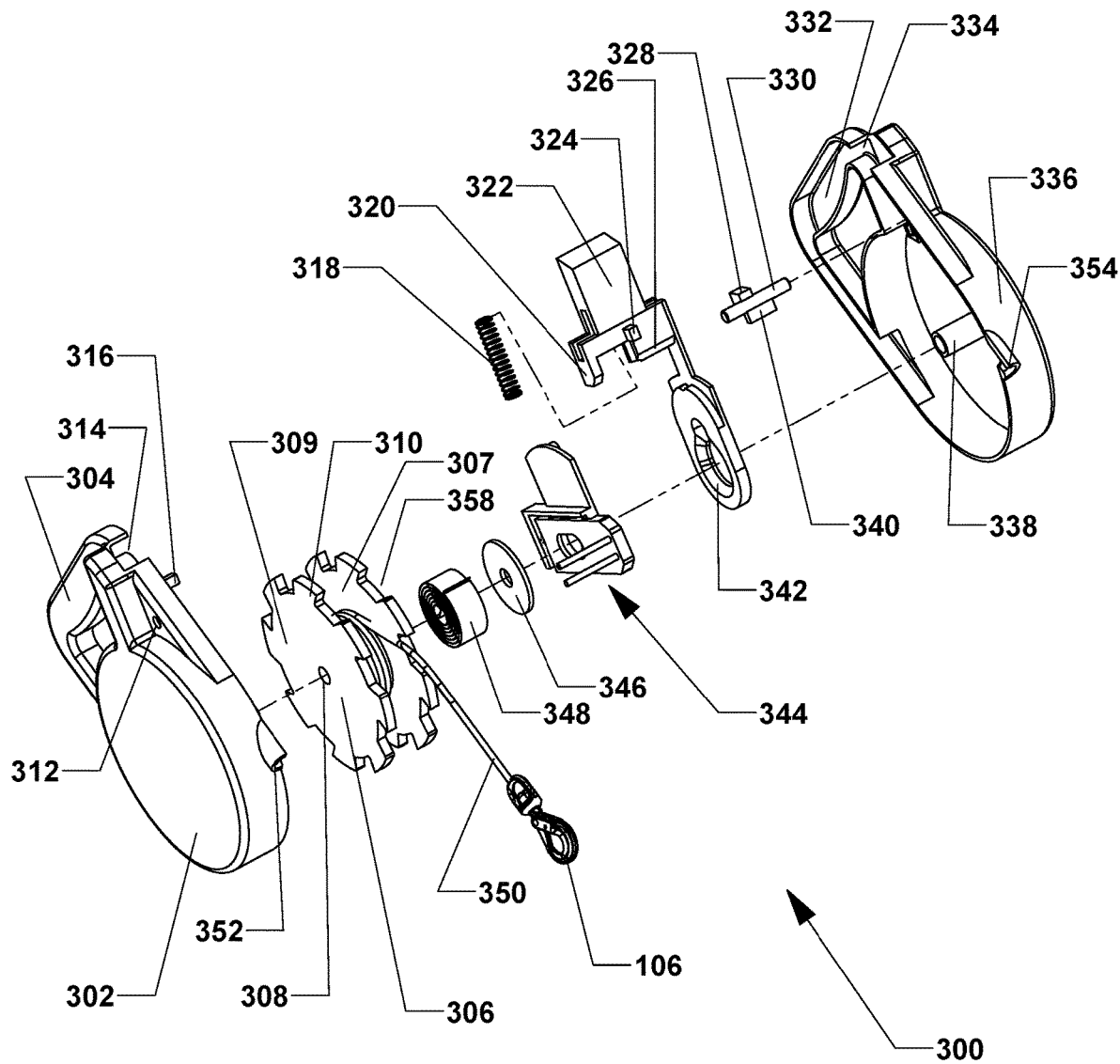
Figure 23:
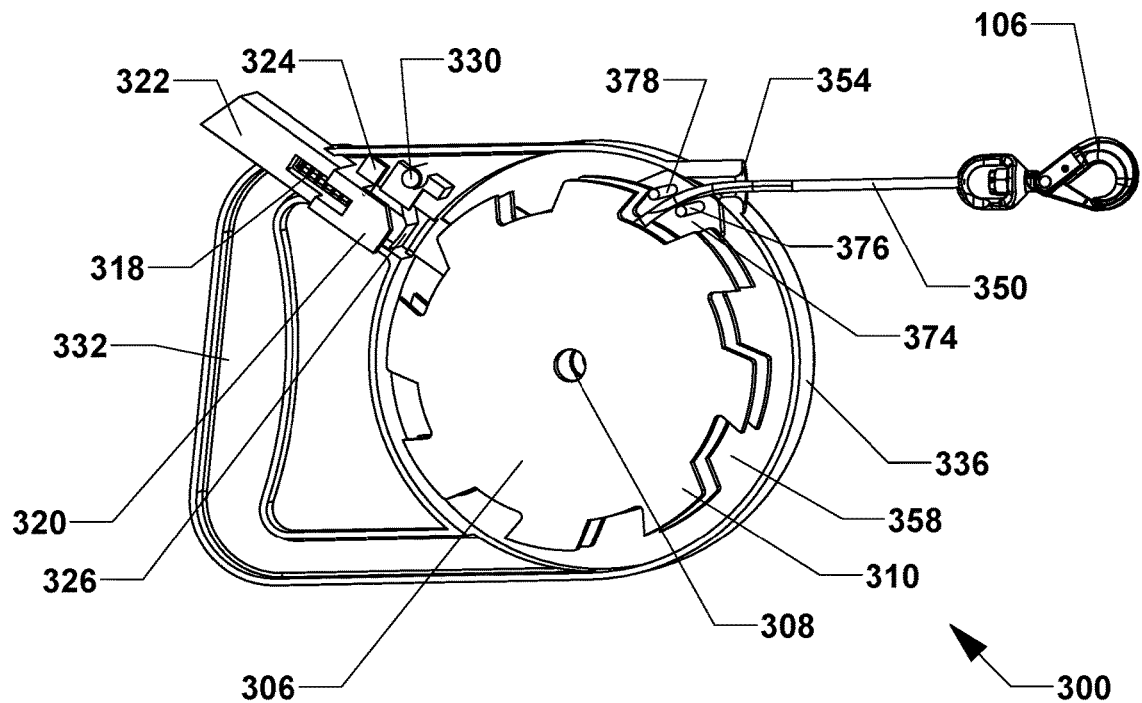
Figure 24:
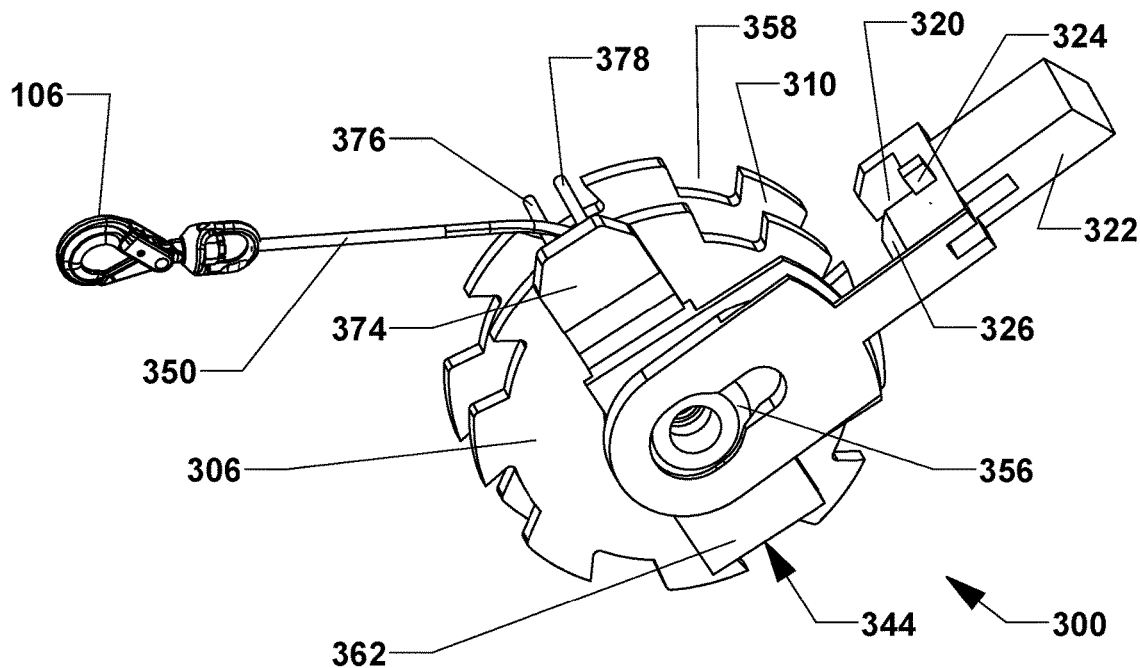
Figure 25:
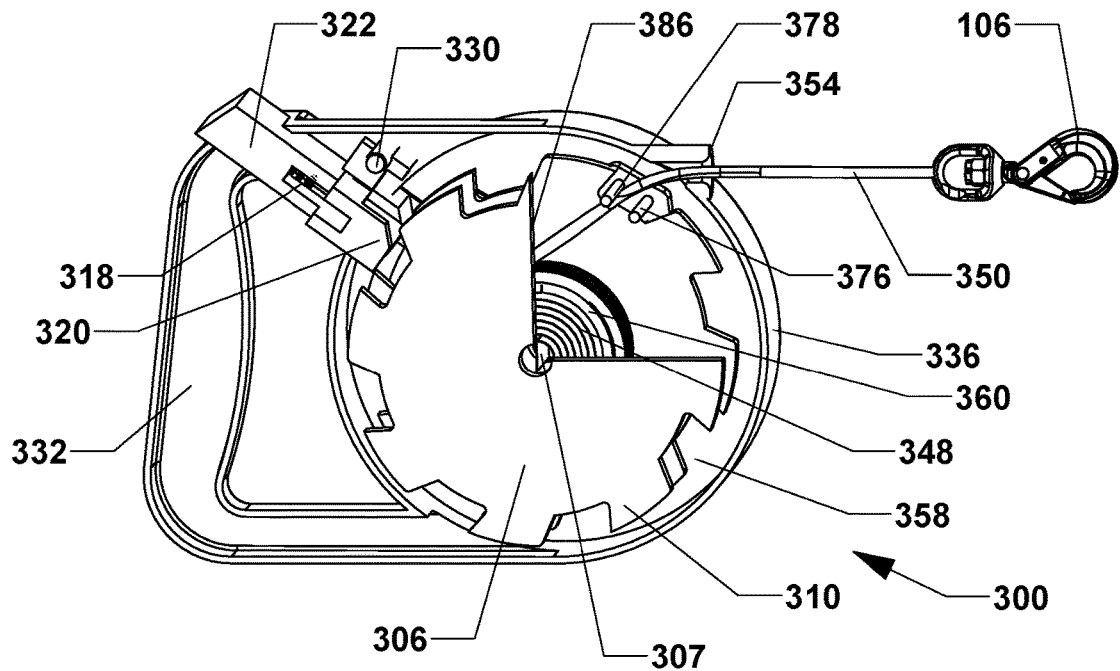
Figure 26:
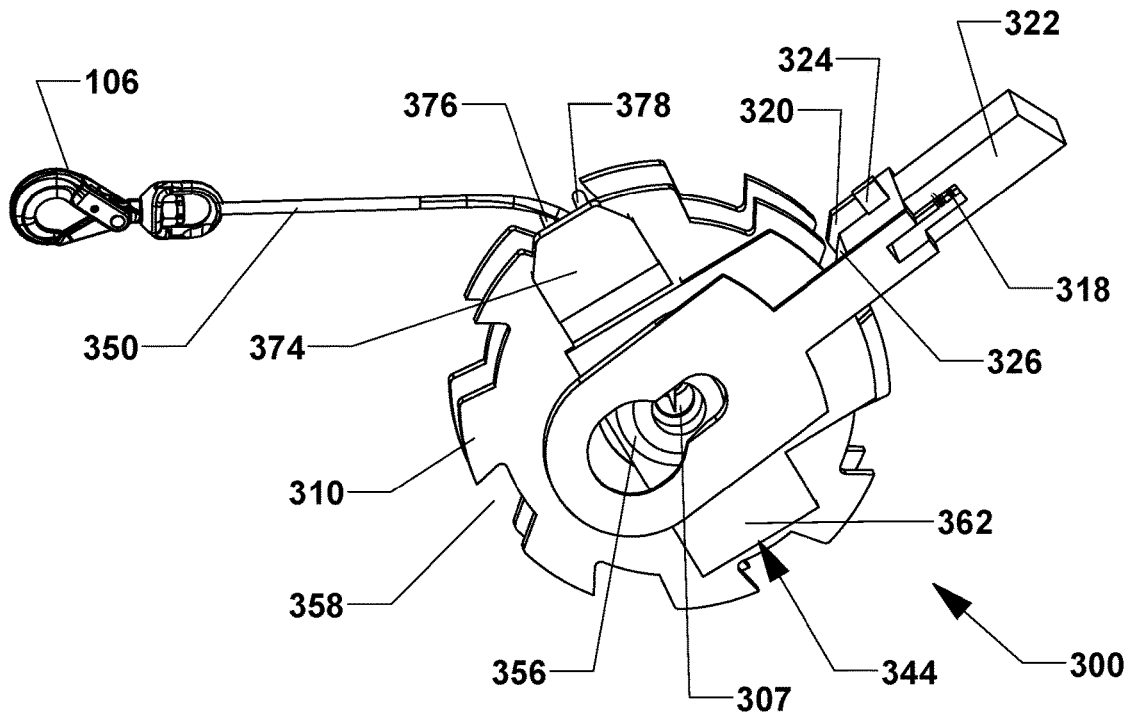
Figure 27:
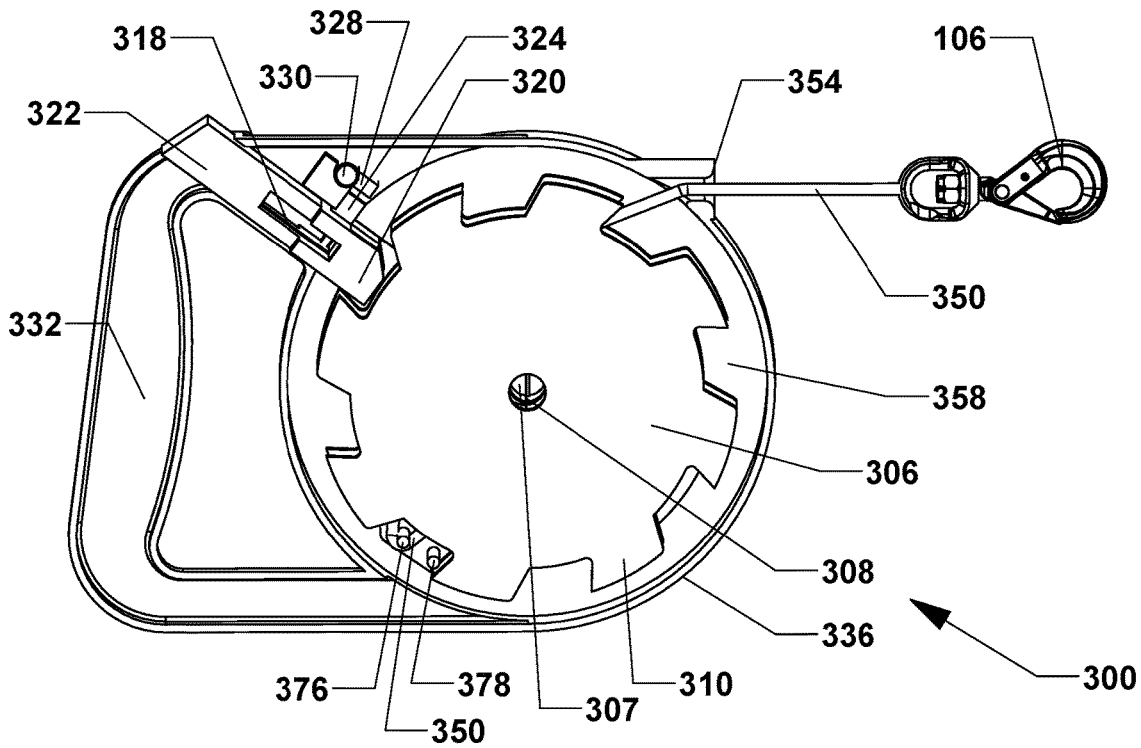
Figure 28:
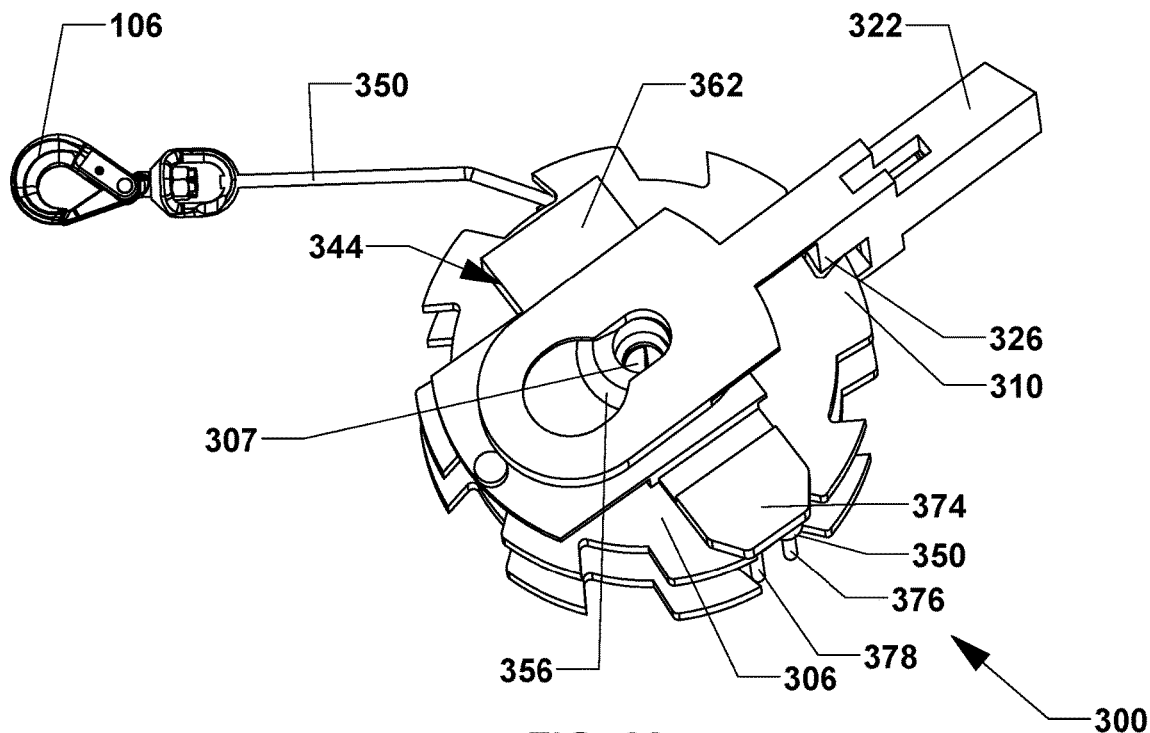
Figure 29:
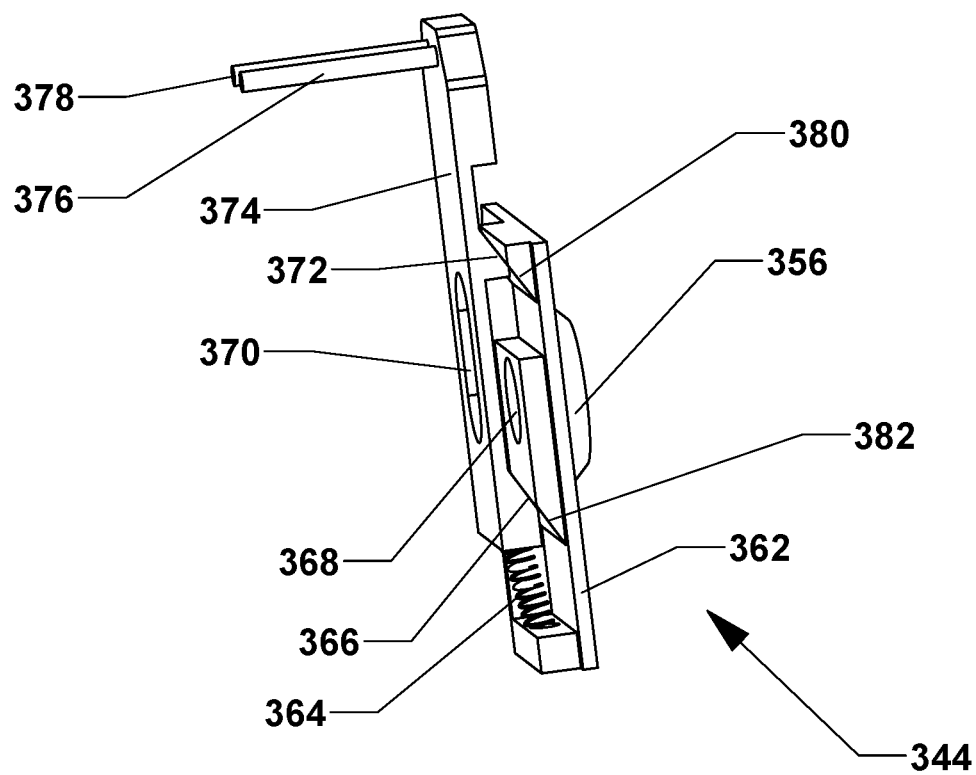
Figure 30:
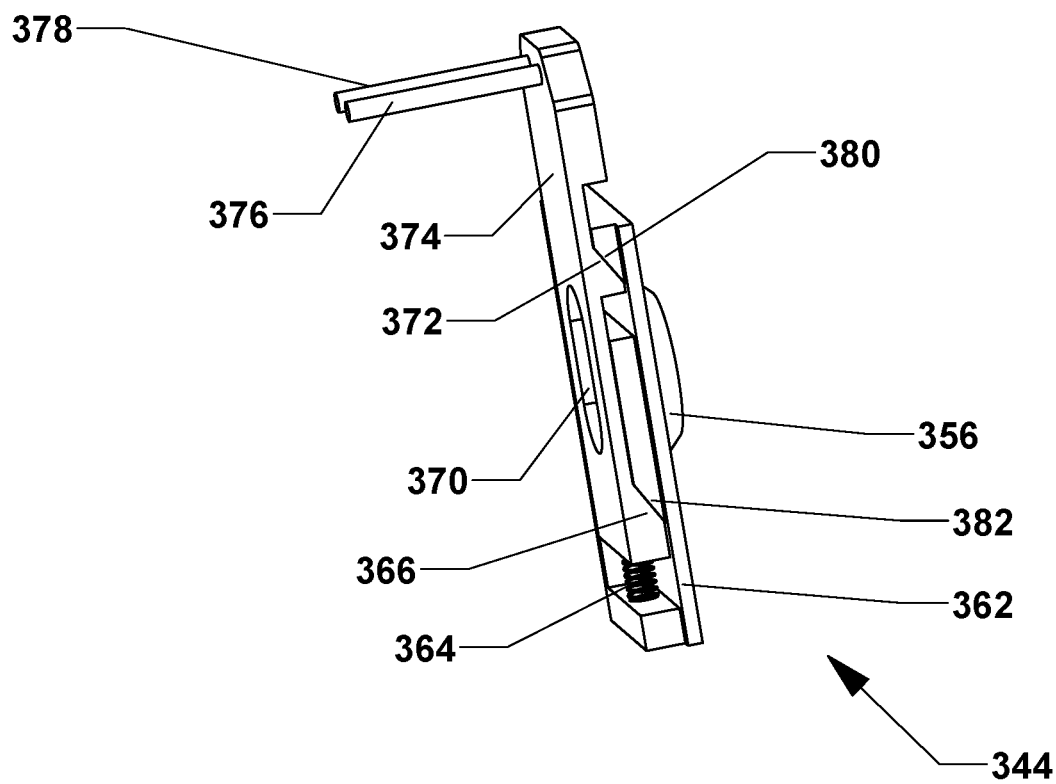

FIG. 12 is a right side elevation view of the interior portion of the left side housing showing a second alternate maximum extension brake on the inside surface of the left side housing in an outward position interacting with the maximum extension brake control shaft to both place the second alternate maximum extension brake in a position for disengagement with the leash line reel and to connect the brake to the left side housing;

FIG. 13 is an assembled right side perspective view showing the second embodiment of the retractable leash device;

FIG. 14 is an exploded side perspective view of the second embodiment showing the components of the second embodiment;

FIG. 15 is a left side perspective view of the second embodiment showing the leash line partially extended; the leash line reel and the maximum extension brake disengaged from each other; and the combination momentary and maximum extension brake control in a generally radial outward position, with the left side housing removed;

FIG. 16 is a left side perspective view of the second embodiment showing the leash line partially extended; the leash line reel and the maximum extension brake disengaged from each other; and the combination momentary and maximum extension brake control in a generally radial outward position, with the left and right side housings removed;

FIG. 17 is a left side perspective view of the second embodiment showing the leash line extended to its maximum set length; the maximum extension brake engaged with the leash line reel; and the combination momentary and maximum extension brake control in a generally radial intermediate inward position, with the left side housing removed;

FIG. 18 is a left side perspective view of the second embodiment showing the leash line extended to its maximum set length, the maximum extension brake engaged with the leash line reel; and the combination momentary and maximum extension brake control in a generally radial intermediate inward position, with the left and right side housings removed;

FIG. 19 is a left side perspective view of the second embodiment showing the leash line partially extended; the leash line reel and the maximum extension brake engaged with each other; and the combination momentary and maximum extension brake control in a generally radial inner most position engaged with the reel thereby, establishing a momentary brake, with the left and right side housings removed;

FIG. 20 is a left side forward facing perspective view of the second embodiment showing the leash line partially extended; the leash line reel and the maximum extension brake engaged with each other; and the combination momentary and maximum extension brake control in a generally radial inner most position engaged with the reel thereby, establishing a momentary brake, with the left and right side housings removed;

FIG. 21 is an assembled right side perspective view showing the third embodiment of the retractable leash device;

FIG. 22 is an exploded side perspective view showing the components of the third embodiment;

FIG. 23 is a right side perspective view of the third embodiment of the retractable leash device, showing the leash line partially extended; the leash line reel and the leash line arresting member disengaged from each other; and the combination momentary and maximum extension brake control in a generally radial outward position, with the right side housing removed;

FIG. 24 is a left side perspective view of the third embodiment showing the leash line partially extended; the leash line arresting member disengaged from the leash line reel; and the combination momentary and maximum extension brake control in a generally radial outward position, with the right side housing and left side housing removed;

FIG. 25 is a right side perspective view of the third embodiment showing the leash line extended to its maximum set length; the leash line arresting member engaged with the leash line reel; and the combination momentary and maximum extension brake control in a generally radial intermediate inward position, with the right side housing removed;

FIG. 26 is a left side perspective view of the third embodiment showing the leash line extended to its maximum set length; the leash line arresting member engaged with the leash line reel; and the combination momentary and maximum extension brake control in a generally radial intermediate inward position, with the right side housing and left side housing removed;

FIG. 27 is a right side perspective view of the third embodiment showing the leash line partially extended; the leash line arresting member engaged with the leash line reel; the combination momentary and maximum extension brake control in a generally radial inter most position; and the momentary brake enabled via the momentary brake stops engaged with the corresponding momentary brake teeth, with the right side housing removed;

FIG. 28 is a left side perspective view of the third embodiment showing the leash line partially extended; the leash line arresting member engaged with the leash line reel; the combination momentary and maximum extension brake control in a generally radial inner most position; and the momentary brake enabled via the momentary brake stops engaged with the corresponding momentary brake teeth, with the right side housing and left side housing removed;

FIG. 29 is a side perspective view of the maximum extension brake assembly of the third embodiment in an expanded state, shown with all other components of the third embodiment removed; and FIG. 30 is a side perspective view of the maximum extension brake assembly of the third embodiment in a retracted state, shown with all other components of the third embodiment removed.

DETAILED DESCRIPTION OF THE EMBODIMENTS

This application relates to a retractable leash device and method therefor that provides for complete leash line extension and retraction when the leash device has been set at one of numerous available maximum leash line extension lengths.

First Embodiment—FIG. 1 Through FIG. 10

Figure 1:
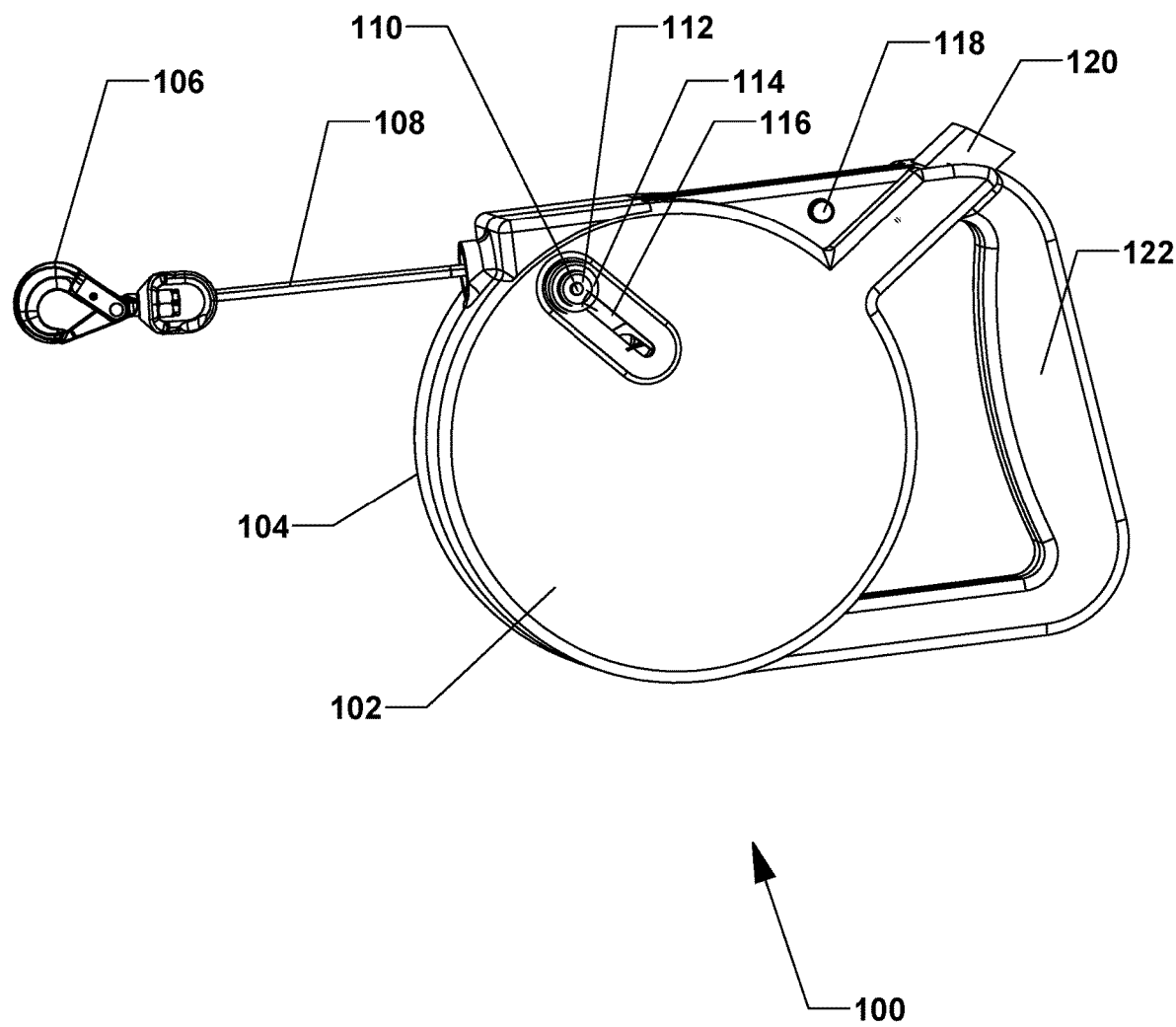
FIG. 1 is an assembled left side perspective view showing the first embodiment of the retractable leash device.
Figure 2:
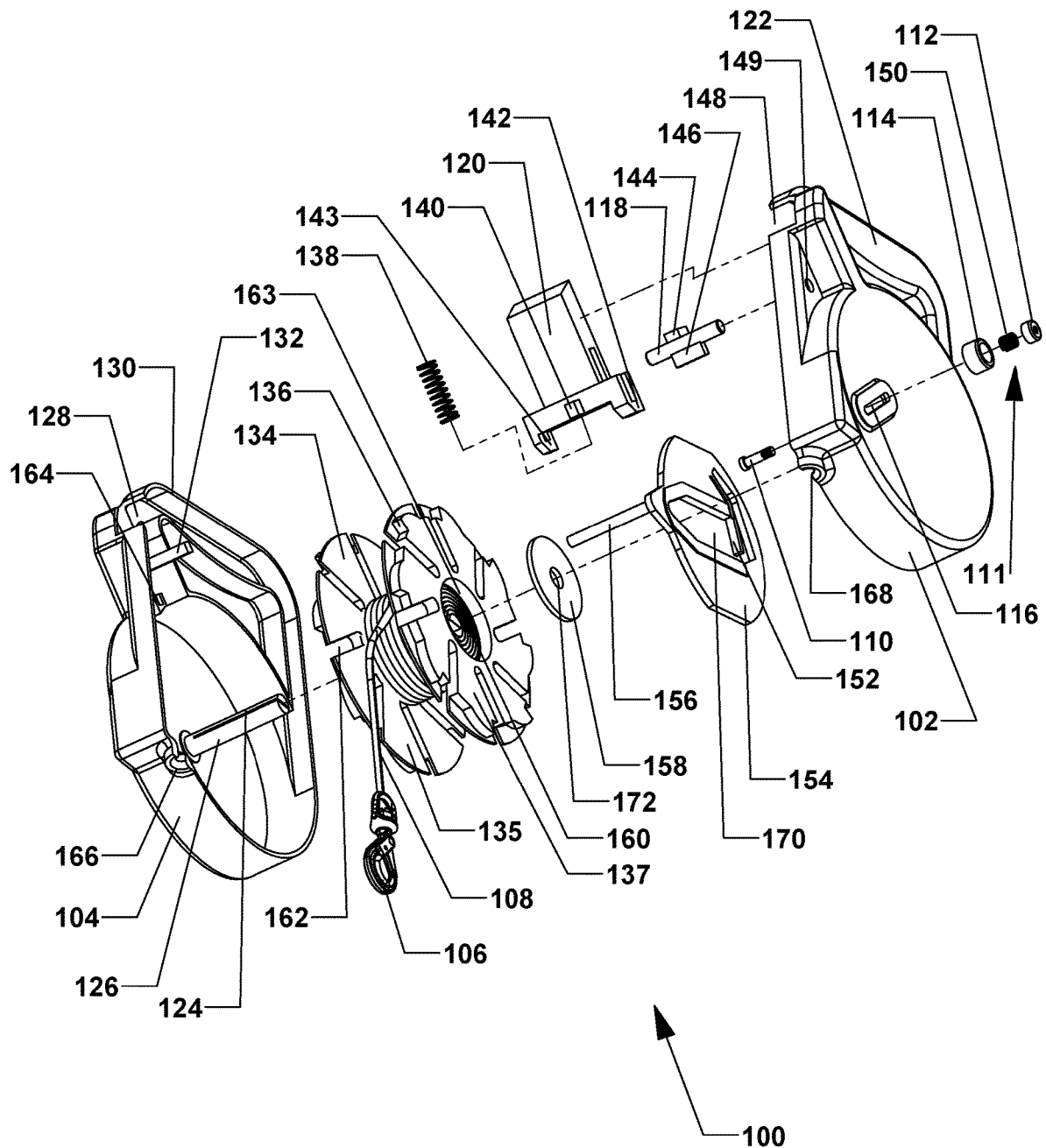
FIG. 2 is an exploded side perspective view showing the components of the first embodiment.

Referring to FIG. 1 and FIG. 2, a first embodiment 100 of the retractable leash device is shown with FIG. 1 depicting an assembled left side perspective view and FIG. 2 depicting an exploded left side perspective view. The first embodiment 100 includes a right side housing 104, a left side housing 102, a leash line connector 106, a leash line or leash 108, a leash line reel 134, a momentary brake control 120, a momentary brake control spring 138, a momentary brake locking pin or locking component 118, a maximum extension brake control assembly or a maximum extension brake control 111, a maximum extension brake 154, a reel constant force spring 160 and a reel spring cover 158.

The right side housing 104 includes a reel axle 126, reel spring slot 124, a right side momentary brake locking pin guide 164, a momentary brake spring beam 132, a right side momentary brake control guide 128, a right side leash line orifice half 166, a right side housing handle half 130 and a locking pin hole (not shown) corresponding to locking pin hole 149 (see below).

The left side housing 102 includes a left side leash line orifice half 168, a left side housing handle 122, a left side momentary brake control guide 148, a maximum extension brake control shaft slot 116, a locking pin hole 149 and a momentary brake locking pin guide (not shown) corresponding to locking pin guide 164 and a left side axle support 178 (see FIG. 8, FIG. 9 and FIG. 10) similar to the left side axle support 272 of the second embodiment 200 (See FIG. 14) and the left side axle support 338 of the third embodiment (See FIG. 22).

The leash line reel 134 includes a right sidewall 135 and a left sidewall 137, open ended inwardly extending maximum extension brake engagement slots 162, each having at least a partially open internal edge, on both the right sidewall 135 and the left sidewall 137, a reel spring recess 163, momentary brake teeth 136 on both the right sidewall 135 and a left sidewall 137 and a reel line winding hub (not shown, similar to reel hub 360, see FIG. 25 for reference) positioned thereinbetween the right sidewall 135 and a left sidewall 137 in which the leash line 108 winds thereupon.

The reel spring cover 158 includes an axle hole 172.

The momentary brake control 120 includes a momentary brake stop 142, a momentary brake stop 143 and a momentary brake lock post 140.

The maximum extension brake 154 includes a guide opening 170, a cantilever spring or resilient biasing component 152 and a maximum extension brake shaft or leash line arresting member 156.

The momentary brake locking pin 118 includes a guide flange 146 and a momentary brake locking post 144.

The maximum extension brake control 111 includes a maximum extension brake control button 112, a maximum extension brake control compression spring 150, a maximum extension brake control collar 114 and a maximum extension brake control shaft 110. The button 112 includes a center treaded hole (not shown). The maximum extension brake control collar 114 includes a recess (not shown) for receiving the maximum extension brake control compression spring 150 and a portion of the control button 112 and a center hole (not shown) for passage of a portion of the maximum extension brake control shaft 110 therethrough. The maximum extension brake control shaft 110 has a threaded outer portion and a shoulder on its inner portion.

Figure 3:
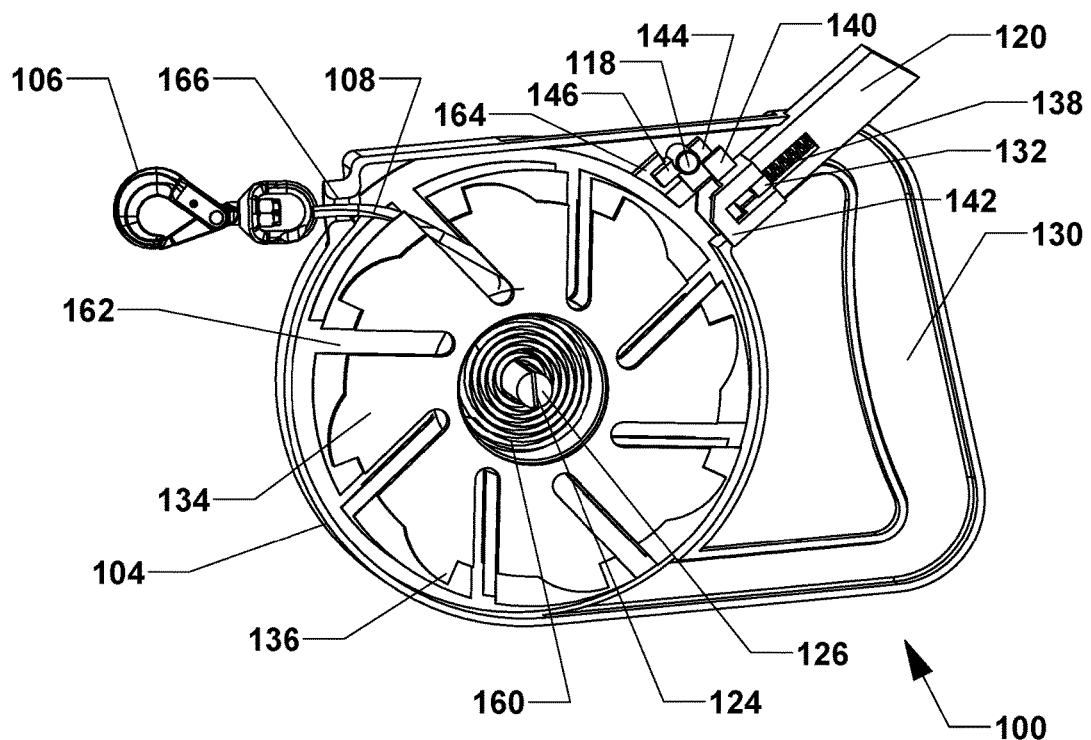
FIG. 3 is a left side perspective view of the first embodiment showing the leash line fully retracted and the momentary brake control in a generally radial outward position disengaged from the reel, with the left housing, reel spring cover and maximum extension brake removed.

Referring to FIG. 3, a left side perspective view of the first embodiment 100 shows the leash line 108 fully retracted and the momentary brake control 120 in a generally radial outward position disengaged from the reel 134, with the left housing 102, reel spring cover 158 and maximum extension brake 154 removed. Also, shown in this figure, is the leash line 108 being wrapped around a hub (not shown, but similar to hub 360) of the reel 134. The reel 134 has a center hole (not shown) in which the axle 126 passes therethtough and provides for rotational support for the reel 134 thereon. The outer end of the reel spring 160 is connected to the reel 134 and its inner end is connected to spring slot 124. The momentary brake control 120 is in an outer position in which the momentary brake stops 142 and 143 are spaced apart from the momentary brake teeth 136 which in-turn provides for disengagement from the reel 134 and thus, retraction of the leash line 108 from energy stored in the reel spring 160. The momentary brake control spring 138 retains the momentary brake control 120 in the outward position while being constrained by momentary brake spring beam 132. The guide flange 146 being slideable in the momentary brake locking pin guide 164 maintains the alignment of momentary brake locking pin 118 which is slideable in hole 182 (see FIG. 8) and a corresponding hole in the right side housing 104. When the momentary brake locking pin 118 is in a right most position, the momentary brake lock post 140 cannot engage with the momentary brake locking post 144 thereby, maintaining the momentary brake control 120 in an unlocked state. Note that the leash line 108 passes through a housing orifice formed by right side leash line orifice half 166 and left side leash line orifice half 168 mating together when the left side housing 102 is attached to the right side housing 104.

Figure 4:
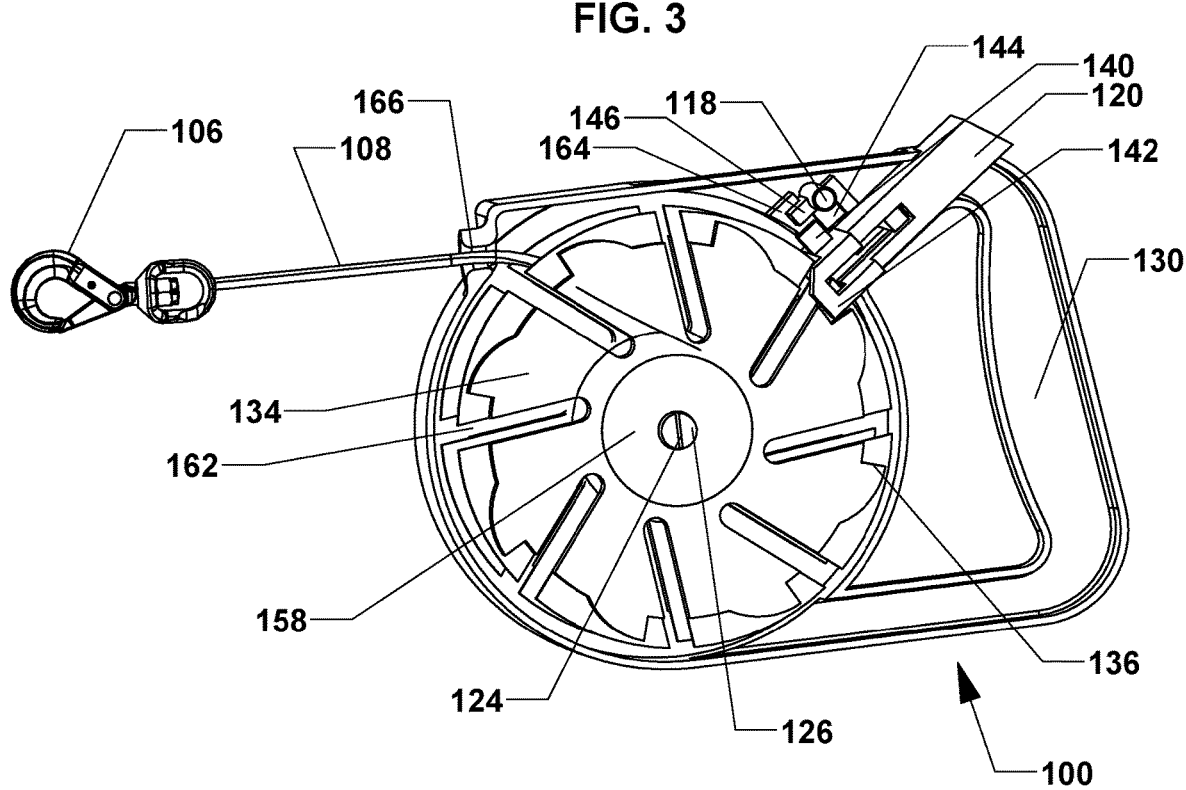
FIG. 4 is a left side perspective view of the first embodiment showing the leash line partially extended and the momentary brake control in a generally radial inward position engaged with the reel thereby, establishing a momentary brake with the left side housing and maximum extension brake removed.

Referring to FIG. 4, a left side perspective view of the first embodiment 100 shows the leash line 108 partially extended and the momentary brake control 120 in a generally radial inward position engaged with the reel 134, with the left side 102 housing and maximum extension brake 154 removed. When the momentary brake control 120 is pressed inwardly compressing momentary brake control spring 138, the momentary brake stops 142 and 143 engage with one of the momentary brake teeth 136 on each side of the reel 134, thereby forming a momentary brake. Upon establishing this momentary brake, the leash line 108 cannot be further extended. When the brake control 120 is released, the control spring 138 will return the brake control 120 to its outward most position thereby, disestablishing the momentary brake. Also note when the momentary brake has been employed, the brake locking pin 118 can be pushed inward such the momentary brake locking post 144 will engage with the momentary brake lock post 140 thereby, preventing the brake control 120 from moving outwardly when the brake control 120 is released and thus, establishing a locked brake.

Figure 5:
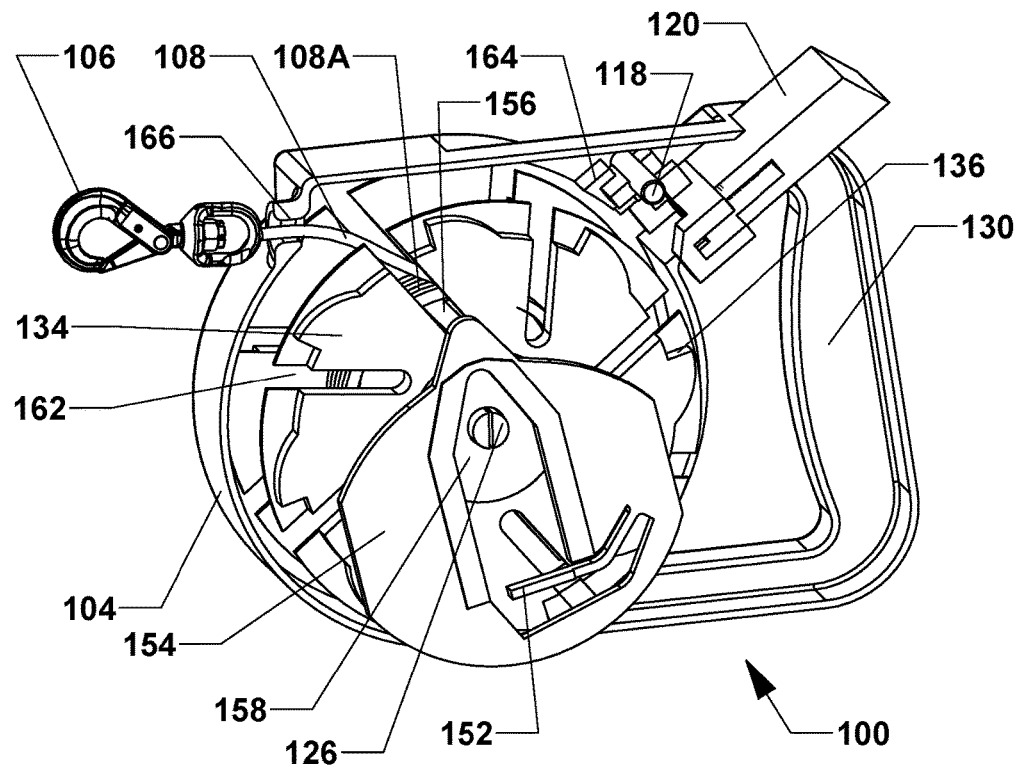
FIG. 5 is a left side perspective view of the first embodiment showing the leash line fully retracted; the maximum extension brake engaged with the leash line reel; and the momentary brake control in a generally radial outward position, with the left side housing removed.

Referring to FIG. 5, a left side perspective view of the first embodiment 100 shows the leash line 108 fully retracted; the maximum extension brake 154 set for a maximum leash line 108 extension; and the brake control 120 in a generally radial outward position, with the left side housing 102 removed. Note that when the leash line 108 is retracted and wound on the reel 134, the previously extended portion of the leash line 108A is wound over the leash line arresting member 156 of the maximum extension brake 154. Also note that the arresting member 156 is in the maximum extension brake engagement slots 162 on each side of the reel 134 and the brake control 120 is in an outward position and therefore, not engaged with the teeth 136 of the reel 134.

Figure 6:
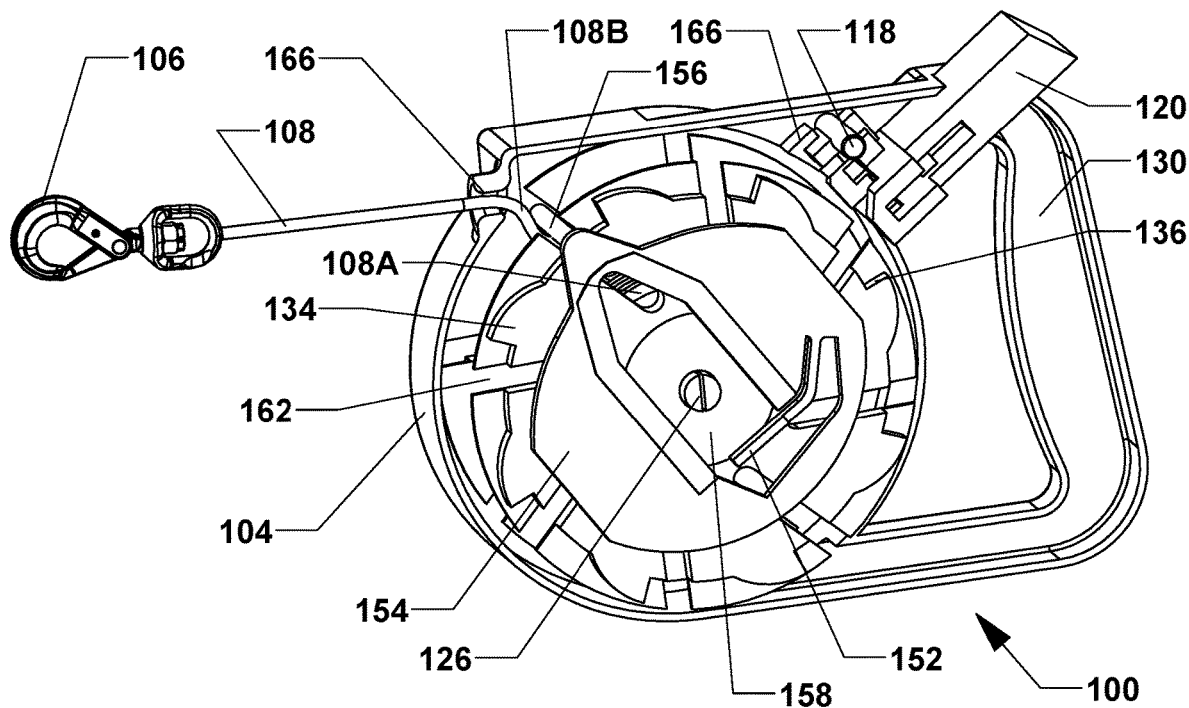
FIG. 6 is a left side perspective view of the first embodiment showing the leash line extended to its maximum set length, emphasizing the maximum extension brake interacting with the leash line to limit leash line extension, with the left side housing removed.

Referring to FIG. 6, a left side perspective view of the first embodiment 100 shows the leash line 108 extended to its maximum set length, with the left side housing 102 removed, emphasizing the maximum extension brake 154 interacting with the leash line 108 to limit leash line 108 extension. As the leash line 108 is extended from its fully retracted state shown in FIG. 5, the leash line 108A is unwound from the reel 134 until the leash line 108 contacts the leash line arresting member 156 which resides in one of the maximum extension brake engagement slots 162 on each side of the reel 134. When this contact occurs (see 108B), the reel 134 is prevented from further rotation in the counter-clockwise direction (although very slight further rotation of the reel 134 and leash line 108 extension can occur due to flexure and stretching of related materials and components under load) thus inhibiting further leash line 108 extension. However, when tension in the leash line 108 is reduced to the point that it is overcome by the reel 134 torque produced by reel spring 160, the leash line 108 can fully retract and wind up on reel 134 over the arresting member 156. When the tension in the leash line 108 is again greater than that of the reel 134 torque produced by the reel spring 160, the leash line 108 can again extend to the maximum set extension length established by the 108B contact. Note the brake control 120 is in an outward position and therefore, not engaged with the teeth 136 of the reel 134.

Figure 7:
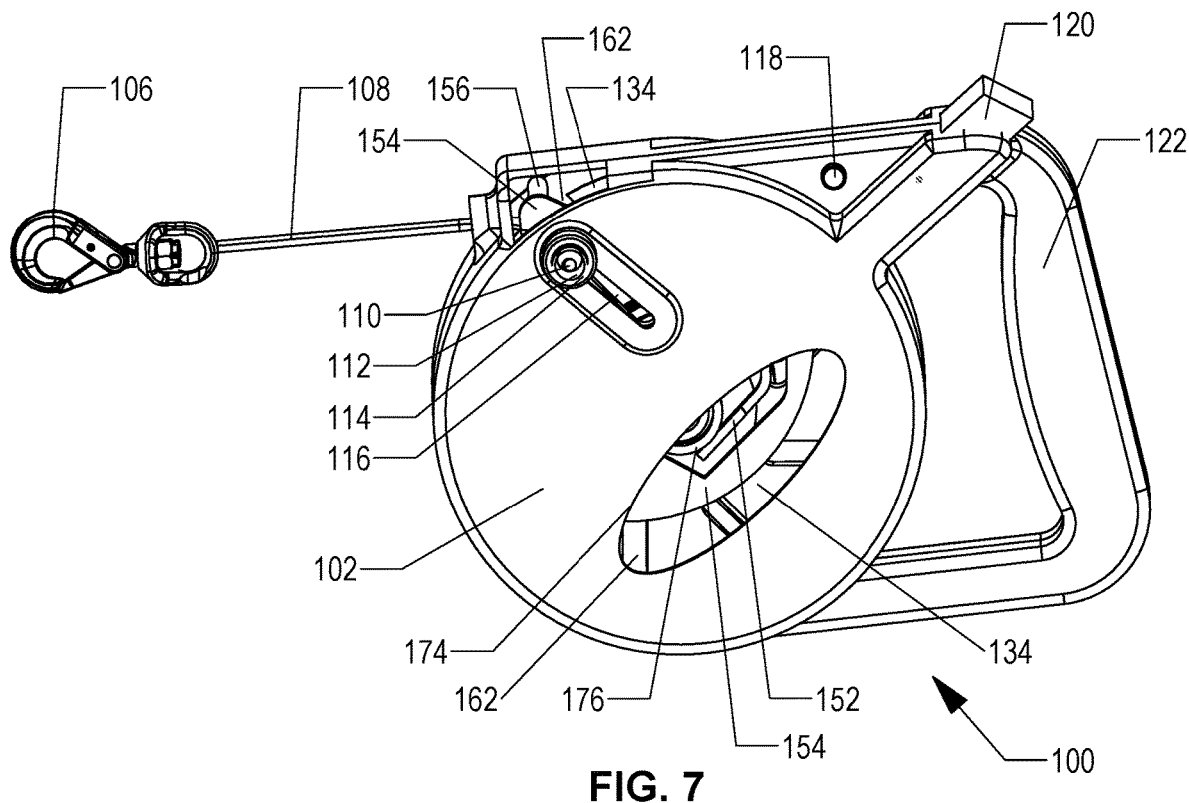
FIG. 7 is a left side perspective view of the first embodiment showing the left side housing having a cutout depicting the arrangement of some of its internal components and the maximum extension brake control in a maximum outward position.

Referring to FIG. 7, a left side perspective view of the first embodiment 100, shows the left side housing 102 having a cutout 174 depicting the arrangement of some of its internal components and the maximum extension brake control button 112 in a maximum outward position in the maximum extension brake control shaft slot 116. The cutout 174 shows the relative positions of the maximum extension brake 154, the reel 134, the cantilevered spring or resilient biasing component 152, the brake engagement slots 162 and the left side housing 102 having a raised collar 176 on its inside surface. Also shown is the maximum extension brake control button 112 threaded onto the maximum extension brake control shaft 110; the maximum extension brake control collar 114 supporting the control button 112; and the maximum extension brake control shaft slot 116 on the left side housing 102. Note that the control button 112; the brake control collar 114; spring 150; and the control shaft 110 can be moved along the control shaft slot 116 as a unit termed, maximum extension brake control, as previously stated. Also, note the cantilever spring or resilient biasing component 152 is in contact with the raised collar 176. When the control button 112 is in the maximum outward position shown, the maximum extension brake 154 is in the position shown in FIG. 8.

Figure 8:
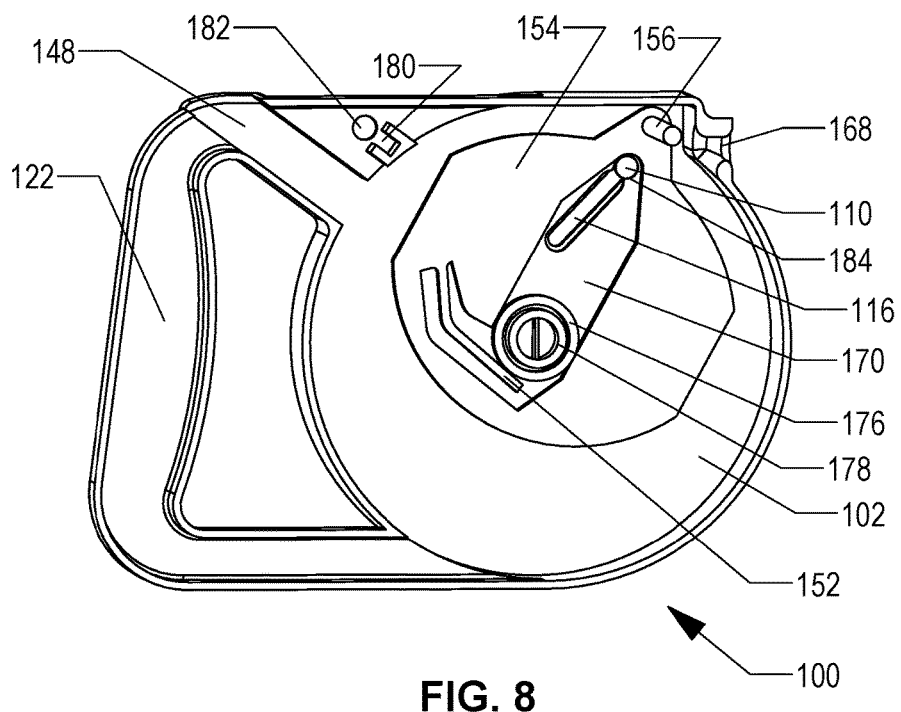
FIG. 8 is a right side elevation view of the interior portion of the left side housing showing the maximum extension brake on the inside surface of the left side housing in an outward position interacting with the maximum extension brake control shaft to place the maximum extension brake in a position for disengagement with the leash line reel.

Referring to FIG. 8, an elevation view of the interior portion of the left side housing 102 shows the maximum extension brake 154 on the inside surface of the left side housing 102 in a maximum outward position interacting with the maximum extension brake control shaft 110 to place the brake 154 in a position for disengagement from the leash line reel 134. Note that the guide opening 170 is aligned by the raised collar 176 thus, aligning the brake 154 with the left side housing 102. Also note, the cantilever spring or resilient biasing component 152 is shown in contact with the raised collar 176 and in a stressed state due to the brake 154 being forced upwardly toward the interior wall of the left side housing 102 by the control shaft 110 (being moved to the upper end of shaft slot 116) contacting the upper end of the guide opening 170 and exerting an upward force on the on the brake 154 and thus, establishing the stressed state in the cantilever spring or resilient biasing component 152. With the brake 154 in its upward position shown, as set by the control shaft 110, the leash line arresting member 156 is positioned out of the related slots 162 which disengages the brake 154 from the reel 134. The purpose of the cantilevered spring 152 is to move the leash line arresting member 156 thereinto the related slots 162 when control shaft 110 is moved down shaft slot 116 and to maintain the leash line arresting member 156 within the applicable slots 162 when the reel 134 is rotated rapidly thereby, producing a centrifugal radial outward force on the brake 154. When changing maximum extension leash line 108 lengths, the cantilevered spring 152 is maintained in a stressed state, as described above.

Figure 9:
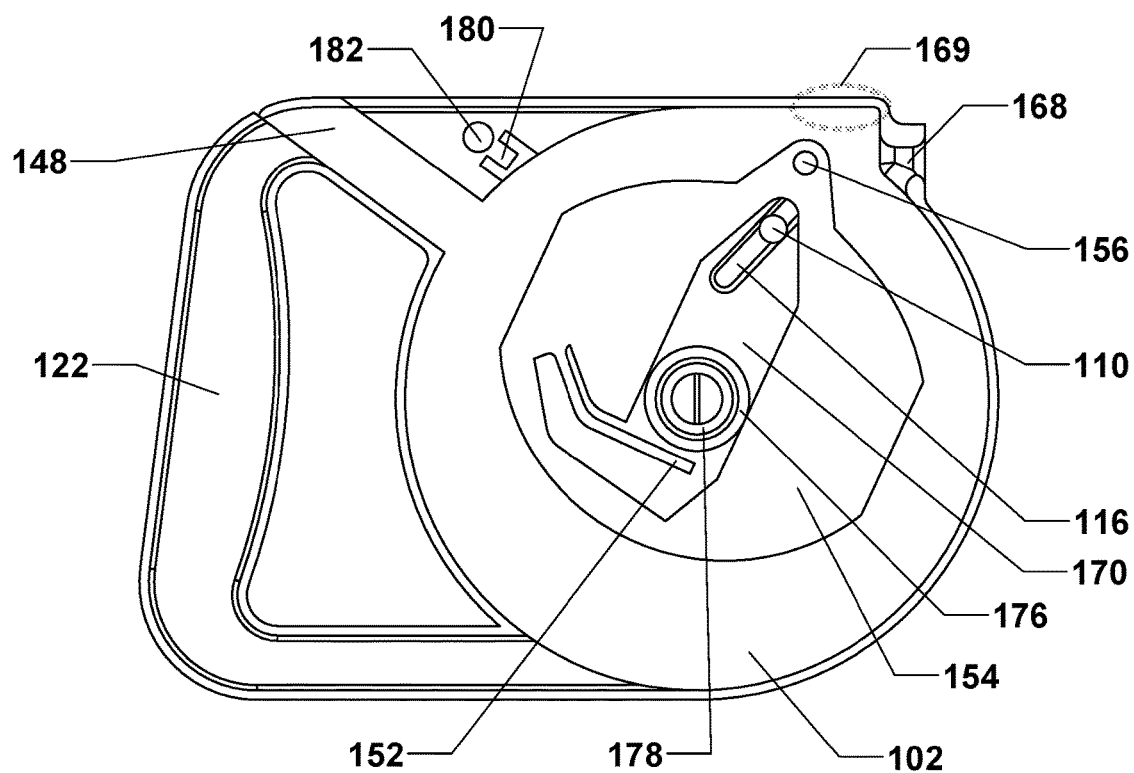
FIG. 9 is a right side elevation view of the interior portion of the left side housing showing the maximum extension brake on the inside surface of the left side housing not interacting with maximum extension brake control shaft to place the maximum extension brake in a position for engagement with the leash line reel.

Referring to FIG. 9, is a right side perspective view of the interior portion of the left side housing 102 shows the maximum extension brake 154 on the inside surface of the left side housing 102 not interacting with maximum extension brake control shaft 110 therefore, establishing the leash line arresting member 156 of the maximum extension brake 154 within the applicable brake engagement slot 162 of the leash line reel 134. Also shown is the cantilever spring or resilient biasing component 152 in a relaxed state and the shouldered end of control shaft 110 not in contact with the brake 154. Since the brake 154 is not in contact with the control shaft 110 it can float as a function of the force of the leash line 108 acting on the arresting member 156 as the leash line 108 is wound over the arresting member 156, as shown in FIG. 5. Note that the control shaft 110 can be moved up or down slot 116 to engage with the upper end of brake opening 170 with the brake 154 in any position.

Figure 10:
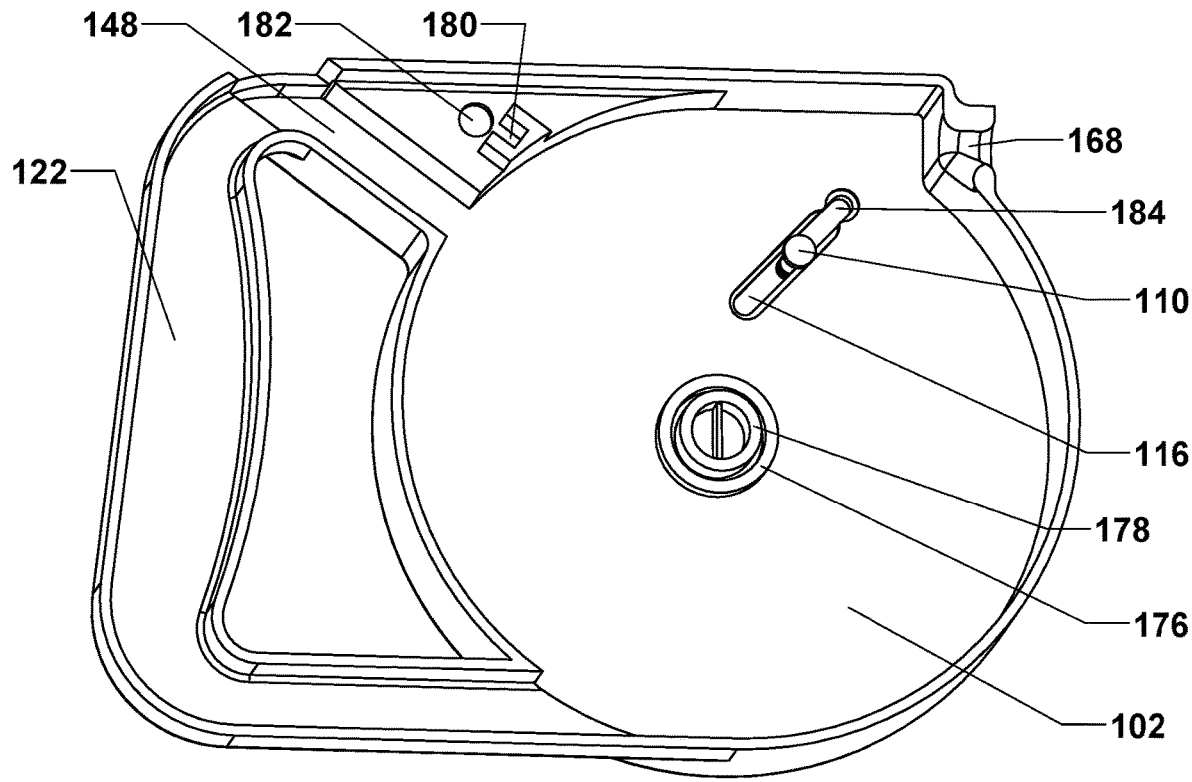
FIG. 10 is a right side perspective view of the interior portion of the left side housing showing the shouldered end of the control shaft residing in maximum extension brake control shaft slot.

Referring to FIG. 10, a perspective view of the interior portion of the left side housing 102 shows the shouldered end of the control shaft 110 residing in the maximum extension brake control shaft slot 116. The control shaft 110 is held in place along slot 116 by the force of the control spring 150 acting on the shaft 110, the housing 102, the collar 114 and the control button 112. However, the shaft 110, the collar 114, the button 112 and spring 150 can easily be moved up and down the slot 116 as a unit. Note that the left side housing 102 has a semi-annular recessed step 184 in the housing 102 positioned at the upper end of slot 116. When the shouldered end of the control shaft 110 is in this recessed step 184, the maximum extension brake control assembly is locked to the housing 102 and cannot be moved by the force produced by the cantilever spring or resilient biasing component 152 acting on the brake 154. However, with the control button 112 pressed inwardly, the shouldered end of shaft 110 of the brake control 111 is moved out of the recessed step 184 and into the lower portion of slot 116 thus, allowing the arresting member 156 to enter into a reel shot 162.

Figure 11:
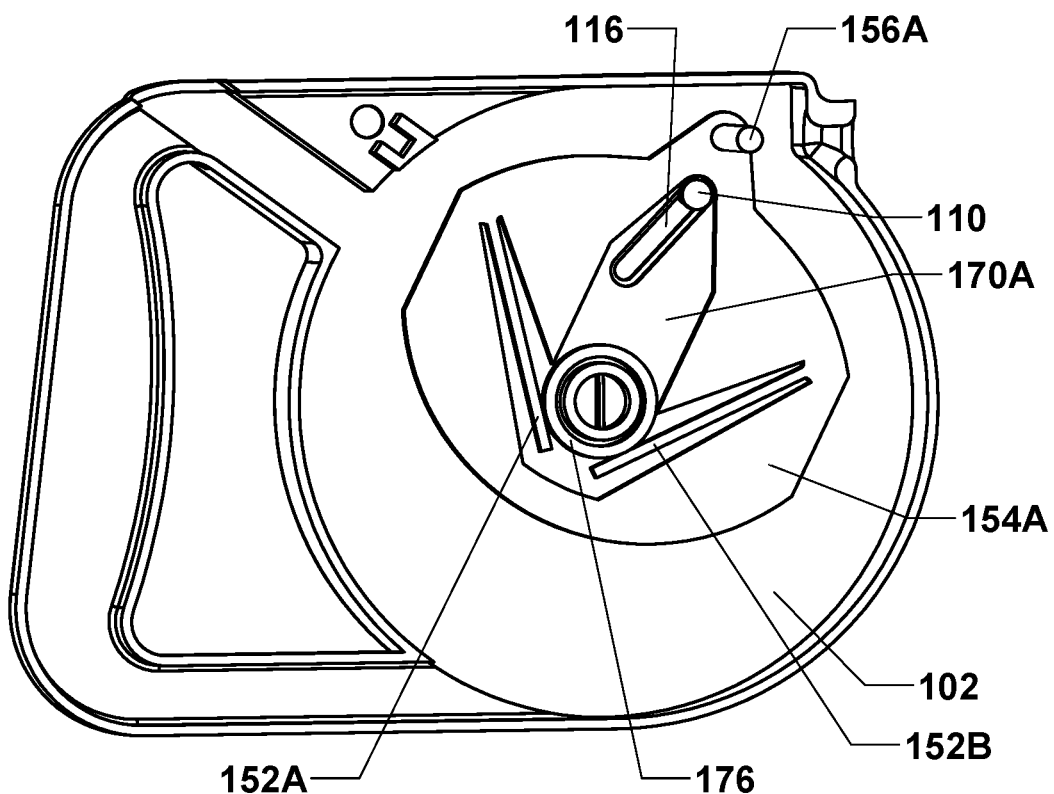
FIG. 11 is a right side elevation view of the interior portion of the left side housing showing a first alternate maximum extension brake on the inside surface of the left side housing in an outward position interacting with the maximum extension brake control shaft to place the first alternate maximum extension brake in a position for disengagement with the leash line reel.

Referring to FIG. 11, an elevation view of the interior portion of the left side housing 102 shows a first alternate maximum extension brake 154A replacing the maximum extension brake 154 on the inside surface of the left side housing 102 in a maximum outward position interacting with maximum extension brake control shaft 110 to place the brake 154A in a position for disengagement with the leash line reel 134. Note that the guide opening 170A is aligned by the raised collar 176 thus, aligning the brake 154A with the left side housing 102. Also note, the first alternate maximum extension brake 154A replaces the cantilever spring or resilient biasing component 152 with two opposing cantilever springs or resilient biasing components 152A and 152B which are in contact with the raised collar 176 and shown in a stressed state due to the brake 154A being forced upwardly toward the interior wall of the left side housing 102 by the control shaft 110 (being moved to the upper end of shaft slot 116 and in recessed step 184) contacting the upper end of the guide opening 170A and exerting an upward force on the on the brake 154A. With the brake 154A in its upward position shown, as set by the control shaft 110, the arresting member 156A is positioned out of the related reel slots 162 which disengages the brake 154A from the reel 134. The purpose of the cantilevered springs or resilient biasing components 152A and 152B is to maintain the leash line arresting member 156A within the applicable reel slots 162 when the reel 134 is rotated rapidly thereby, producing a centrifugal radial outward force on the brake 154A. When changing maximum leash line 108 lengths, the cantilevered springs 152A and 152B are maintained in a stressed state, as described above.

Referring to FIG. 12, an elevation view of the interior portion of an alternate left side housing 102A shows a second alternate maximum extension brake 154B replacing the maximum extension brake 154 on the inside surface of the alternate left side housing 102A (which replaces the left side housing 102) in a maximum outward position interacting with maximum extension brake control shaft 110 to place the brake 154B in a position for disengagement with the leash line reel 134. Note that the guide opening 170B is aligned by the raised collar 176 thus, aligning the brake 154B with the left side housing 102A. Also note, the second alternate maximum extension brake 154B replaces the cantilever spring or resilient biasing component 152 with two opposing cantilever springs or resilient biasing components 152C and 152D which are shown in contact with the raised collar 176 and in a stressed state due to the brake 154B being forced upwardly toward the interior wall of the left side housing 102A by the control shaft 110 (being moved to the upper end of shaft slot 116A) contacting the upper end of the guide opening 170B and exerting an upward force on the on the brake 154B. With the brake 154B in its upward position shown, as set by the control shaft 110, the brake shaft 156B is positioned out of the related reel slots 162 which disengages the brake 154B from the reel 134. The purpose of the cantilevered springs or resilient biasing components 152C and 152D is to maintain the arresting member 156B within the applicable reel slots 162 when the reel 134 is rotated rapidly thereby, producing a centrifugal radial outward force on the brake 154B. When changing maximum leash line 108 lengths, the cantilevered springs 152C and 152D are maintained in a stressed state, as described above.

The difference between the left side housing 102 and left side housing 102A relates to the difference between shaft slot 116 and shaft slot 116A and added housing post 188. Shaft slot 116A has an offset orientated toward the rear of leash 100 at its upper end. The left side housing 102A also has a post 188 positioned as shown in FIG. 12. The difference between brake 154A and brake 154B is that brake 154B has a brake slot 186 that receives the post 188 and secures the brake 154B to the left housing 102A in order to maintain the leash line arresting member 156B out of reel slots 162. Note that shaft slot 116A does not have the recessed step 184 as does shaft slot 116 because post 188 and slot 186 in combination maintain the brake 154B disengaged from the reel 134, as opposed to the control shaft 110 and recessed step 184 in combination maintaining the brake 154A disengaged from the reel 134.

Operation of the First Embodiment—FIG. 3 Through FIG. 12

To operate the first embodiment 100 of the disclosed invention, a user holds the retractable leash device 100 by the handle formed by the combination of right side housing handle half 130 and the left side housing handle half 122 upon assembly of the first embodiment 100 and sets the leash line 108 maximum extension length from an existing maximum extension length to a new maximum extension length. To set a new maximum extension length from the existing maximum length setting, the following steps are performed: (1) the leash line 108 is extended until the existing maximum extension limit is reached, (2) the maximum extension brake control button 112 is pushed inward and moved upward, while engaging the shoulder of the maximum extension brake control shaft 110 with the upper end of guide opening 170, to the upper end of slot 116 and released thereby, allowing the shoulder of the maximum extension brake control shaft 110 to engage with the semi-annular recessed step 184 and thus, maintain the maximum extension brake 154 disengaged from the reel 134, since the arresting member 156 is held remote from the reel slots 162, (3) the leash line 108 is either extended or retracted to the desired maximum extension length, (4) the control button 112 is pushed inward, to disengage the control shaft 110 from the recessed step 184, and then moved down the slot 116 to allow the arresting member 156 to re-engage with a respective slot 162 as the reel 134 is rotated and thus, re-engage the maximum extension brake 154 with the reel 134 and (5) the maximum extension of the leash line 108 is now set and the leash line 108 is then allowed to fully or partially extend and retract, as desired.

The new leash line 108 maximum extension length has now been set allowing the leash line 108 to fully extend to the new maximum extension length and fully retract repeatedly. With this new maximum extension length established, the connector 106 can be connected to the animal's collar or other restraining equipment. Note that the above maximum extension length re-setting steps can be performed with the leash line attached to the animal.

To explain how the leash line 108 maximum extension length is established, the following information is provided. When the leash line 108 is extended to the maximum extension length, the 108B contact between the leash line 108 and the arresting 156 is made thereby, aligning the guide opening 170 with the shoulder of the control shaft 110. While maintained at this alignment, the control shaft 110 can be engaged with the guide opening 170 by pressing the control button 112 inward. With the control button 112 pressed inward, the control shaft 110 is moved up slot 116, engaging with the upper end of the guide opening 170 and further, engaged with recessed step 184 thereby, locking the brake control assembly to the left side housing 102. As a result, the leash line arresting member 156 is moved along and out of the related slots 162 thereby, disengaging the reel 134 from the arresting member 156. Note that with the arresting member 156 positioned out of slots 162, the cantilever spring or resilient biasing component 152 is in a flexed stressed state (see FIG. 8) being held against the raised collar 176.

With the reel 134 disengaged, the leash line 108 is either extended or retracted to a new maximum extension length. The control shaft 110 is then disengaged from the recessed step 184 by pressing the control button 112 inward and moving the control assembly down slot 116 thereby, permitting the stressed cantilever spring or resilient biasing component 152 to force the leash line arresting member 156 into the corresponding aligned slots 162. With the arresting member 156 within slot 162, the reel 134 is engaged with the maximum extension brake 154, thus setting the new maximum leash line 108 extension length.

While using the retractable leash device with a maximum leash line 108 length established, the momentary brake can be employed in an emergency, by pressing on the momentary brake control 120 inward, to keep the associated animal at a safe distance and then the control 120 released when the emergency has passed to return the first embodiment 100 to the set leash line 108 maximum extension length and the automatic full retraction capability. If it is desired to maintain the momentary brake for a length of time, so as to keep the reel disabled from rotation, then the momentary brake locking pin 118 can be pressed inward to lock the momentary brake control 120 in as inward position.

With respect to the brake 154A and corresponding left side housing 102, the operation of the first embodiment is the same as described above.

With respect to the brake 154B and corresponding left side housing 102A, the operation of the first embodiment differs as follows. The maximum extension brake control button 112 is pushed inward and moved upward, while engaging the shoulder of the control shaft 110 with the upper end of guide opening 170B, to the upper end of slot 116A and then to the rear end of slot 116A thus, positioning slot 186 thereabout post 188. Upon releasing the control button 112, the maximum extension brake 154B is maintained disengaged from the reel 134 since the arresting member 156B is held remote from the reel slots 162. To re-engage the maximum extension brake 154B with the reel 134, the control button 112 is pushed inward and then forward to move the slot 186 apart from post 188 and then moved down slot 116A allowing arresting member 156B to re-enter respective reel slots 162.

Second Embodiment—FIG. 13 Through FIG. 20

Referring to FIG. 13 and FIG. 14, a second embodiment 200 of the retractable leash device is shown with FIG. 13 depicting an assembled right side perspective view and FIG. 14 depicting an exploded right side perspective view. The second embodiment 200 includes a right side housing 202, a left side housing 210, a leash line reel 224, a maximum extension brake 230, a combination momentary and maximum extension brake control 206, a brake control spring 232, a maximum extension brake locking pin or locking component 208, a leash line or leash 212, the leash line connector 106, a reel constant force spring 264, a reel spring cover 262 and a brake disengagement spring 260.

The right side housing 202 includes a reel axle 268 with slot similar to slot 124 for attachment of the inner end of the reel spring 264, a right side brake locking pin hole 270, a right side brake control guide 216, a brake spring beam 218, a right side leash line orifice half 276 and a right side housing handle half 204.

The left side housing 210 includes a left side housing handle half 242, a left side brake control guide 244, a left side leash line orifice half 274, a left side axle support 272 and a hole (not shown) opposite to the right side brake locking pin hole 270.

The leash line reel 224 includes a right sidewall 227 and a left sidewall 226, momentary brake teeth 222 positioned on the right sidewall 227, a reel axle hole 266, engagement slots 220, each having a closed internal edge, on the right sidewall 227, a reel line winding hub (not shown, but similar to reel hub 360, see FIG. 25 for reference) positioned thereinbetween the right sidewall 227 and a left sidewall 226 in which the leash line 212 winds thereupon and a reel spring recess (not shown) similar to the recess 163 that houses the reel spring 264.

The maximum extension brake 230 includes a leash line opening 256, momentary brake teeth 252, a maximum extension brake inner surface 258, a maximum extension brake drum or leash line arresting member 254 and a concentric hole (not shown) for the axle 268 to pass therethrough. The leash line arresting member 254 includes engagement cogs (typical) 228.

The combination momentary and maximum extension brake control 206 includes a momentary brake stop 234, a momentary brake stop 236, a maximum extension brake lock post 238, a maximum extension brake circular female ramp 250 and a maximum extension brake anti-rotation post 248.

The maximum extension brake locking pin 208 includes a guide flange 246 and a brake pin locking post 240.

Referring to FIG. 15 and FIG. 16, left side perspective views of the second embodiment 200 shows the leash line 212 partially extended; the leash line reel 224 and the maximum extension brake 230 disengaged from each other; and the combination momentary and maximum extension brake control 206 in a generally radial outward position, with the left side housing 210 removed (FIG. 15) and both the left and right side housings, 210 and 202, respectively removed (FIG. 16). Note that the maximum extension brake 230 incorporates a circular male ramp 278 on its left side. Not shown, the outer diameter surface of the reel right sidewall 226, positioned within the inner surface 258 (FIG. 14), provides support to the right side of the maximum extension brake 230.

When the combination momentary and maximum extension brake control 206 is in the outward position shown, the maximum extension brake 230 is disengaged from the leash line reel 224, since the engagement cogs 228 are not positioned within the corresponding engagement slots 220. The leash line reel 224 and the maximum extension brake 230 are maintained separated from each other by the brake disengagement spring 260 acting thereon against the reel spring cover 262. Note that the leash line 212 passes through the leash line opening 256 without contacting either upper or lower edge of the opening 256 and then through the right side leash line orifice half 276. FIG. 15 also shows a right side maximum extension brake locking pin guide 280 and the related maximum extension brake locking pin 208. The locking pin guide 280, the locking pin 208 and the brake locking post 238 have the same configuration and function as with the corresponding components in the first embodiment 100 in that they serve to lock the combination momentary and maximum extension brake control 206 in the inward position. The brake control spring 232 has the same function as the corresponding spring 138 in the first embodiment 100 in that it returns the combination momentary and maximum extension brake control 206 to an outward position when not being pressed.

Referring to FIG. 17 and FIG. 18, a left side perspective view of the second embodiment 200 shows the leash line 212 extended to its maximum set length, the maximum extension brake 230 engaged with the leash line reel 224; and the combination momentary and maximum extension brake control 206 in a generally radial intermediate inward position, with the left side housing 210 removed, (FIG. 17) and both the left and right side housings 210 and 202, respectively removed, (FIG. 18).

When the combination momentary and maximum extension brake control 206 is in the intermediate inward position shown, the maximum extension brake 230 is engaged with the leash line reel 224, since the engagement cogs 228 are positioned within the corresponding engagement slots 220. As the control 206 is pushed inward from its outward position, the female ramp 250 contacts the circular male ramp 278 and pushes the maximum extension brake 230 axially against the leash line reel 224 such that as the leash line 212 is slightly extended or retracted, the engagement cogs 228 engage in the corresponding engagement slots 220 thereby, locking the leash line reel 224 and the maximum extension brake 230 together in an engagement state. When the maximum extension brake locking pin 208 is pushed inward, the brake pin locking post 240 contacts the corresponding maximum extension brake locking post 238 and retains the brake control 206 in the intermediate inward position thus, maintaining the leash line reel 224 and the maximum extension brake 230 in a locked engagement state.

As the leash line 212 is extended outward with the leash line reel 224 and the maximum extension brake 230 in a locked state, note that the upper or right most edge 282 of the leash line opening 256 contacts the leash line 212 as the maximum extension brake 230 is rotated counterclockwise which prevents further counterclockwise rotation of the leash line reel 224 thereby, establishing the maximum extension brake and thus, the maximum extension of the leash line 212 (although very slight further rotation of the leash line reel 224 and leash line 212 extension can occur due to flexure and stretching of related materials and components under load).

Note the entire maximum extension brake drum or leash line arresting member 254 could encompass only a cross sectional arc the width of one cog 228 and therefore, the maximum extension brake drum or leash line arresting member 254 itself could be inserted into an engagement slot 220. If the maximum extension brake drum or leash line arresting member 254 is limited to one cog 228 then the leash line arresting member 254 does not have to have an arc cross section.

Also, note that the established maximum extension brake in the first embodiment 100 and the second embodiment 200 are accomplished in essentially the same manner by an arresting member engaged with the reel and crossing the leash line, at least in part, thereinbetween the hub of the reel and the leash line housing orifice. The leash line arresting member could be of any configuration, either simple or complex, such as a shaft, bar, plate, beam, channel, tube, cylinder and the like. Also note that the leash line tensile load is solely carried by the leash line arresting member and associated engaged leash line reel.

When the established maximum extension brake has been set via the engagement of the leash line reel 224 and the maximum extension brake 230, retraction of the leash line 212 results in the winding of the leash line 212 thereupon the maximum extension brake drum or leash line arresting member 254. When a maximum extension brake has not been set and the leash line reel 224 and the maximum extension brake 230 are not engaged, the leash line 212 winds thereupon the hub (not shown) of the leash line reel 224.

Referring to FIG. 19 and FIG. 20, left side perspective views of the second embodiment 200 shows the leash line 212 partially extended; the leash line reel 224 and the maximum extension brake 230 engaged with each other; and the combination momentary and maximum extension brake control 206 in a generally radial inner most position, with the right side housing 202 and left side housing 210 removed.

With the maximum extension brake control 206 in the inner most position, the momentary brake is enabled, as the momentary brake stop 234 and the momentary brake stop 236 are engaged with momentary brake teeth 222 and the momentary brake teeth 252, respectively. With respect to FIG. 19, note that the brake control 206 has moved further over the circular male ramp 278 but since the circular female ramp 250 has moved beyond the male ramp 278, there is no more additional force acting on the maximum extension brake 230 causing it to move further axially inward toward the reel 224.

Operation of the Second Embodiment—FIG. 15 Through FIG. 20

To operate the second embodiment of the disclosed invention, a user holds the retractable leash device 200 by the handle formed by the combination of right side housing handle half 204 and the left side housing handle half 242 upon assembly of the second embodiment 200 and sets the leash line 212 maximum extension length from an existing maximum extension length to a new maximum extension length. To set a new maximum extension length from an existing maximum extension length setting, the following steps are performed: (1) the leash line 212 is extended until the existing maximum extension limit is reached, (2) the brake locking pin 208 is pushed until the brake pin locking post 240 disengages with the maximum extension brake locking post 238 which permits the combination momentary and maximum extension brake control 206 to move from its intermediate inward position to its outer position via the force provided by the brake control spring 232. This in-turn results in the disengagement of the maximum extension brake 230 from the leash line reel 224, as the brake disengagement spring 260 forces the brake 230 to axially separate from the reel 224 and thus, the engagement cogs 228 to exit the engagement slots 220, (3) with the maximum extension brake 230 disengaged from the leash line reel 224, the leash line 212 is either extended or retracted until the desired maximum extension length is reached, (4) the brake control 206 is then pushed inward as the leash line 212 is slightly extended or retracted until the maximum extension brake 230 is engaged with the leash line reel 224 and (5) with the brake control 206 held inward, the brake locking pin 208 is pushed inward until the brake pin locking post 240 engages with the maximum extension brake locking post 238. The new maximum extension leash line length is now set and the leash line 212 is then allowed to fully or partially retract, as desired.

The new leash line 212 maximum extension length has now been set allowing the leash line 212 to fully extend to the new maximum extension length and fully retract repeatedly. With this new maximum extension length established, the connector 106 can be connected to the animal's collar or other restraining equipment. Note that the above maximum extension length re-setting steps can be performed with the leash line 212 attached to the animal.

While using the retractable leash device with a maximum leash line 212 length established, the momentary brake can be employed in an emergency, by pressing the brake control 206 to its inner most position, to keep the associated animal at a safe distance and then the control 206 released when the emergency has passed to return the second embodiment 200 to the set leash line 212 maximum extension length and the automatic full retraction capability.

Third Embodiment—FIG. 21 Through FIG. 30

Referring to FIG. 21, FIG. 22, FIG. 29 and FIG. 30, a third embodiment 300 of the retractable leash device is shown with FIG. 21 depicting an assembled right side perspective view; FIG. 22 depicting an exploded side perspective view; FIG. 29 depicting the maximum extension brake assembly in an expanded state; and FIG. 30 depicting the maximum extension brake assembly in a retracted state. The third embodiment 300 includes a right side housing 302, a left side housing 336, a leash line reel 306, a combination momentary and maximum extension brake control 322, a brake control spring 318, a maximum extension brake locking pin or locking component 330, a leash line or leash 350, the leash line connector 106, a constant force reel spring 348, a reel spring cover 346 and a maximum extension brake assembly or maximum extension brake 344, The right side housing 302 includes a reel axle (not shown but the same as reel axles 126 and 268 of the first and second embodiments, respectively), a right side brake locking pin hole 312, a right side brake control guide 314, a brake spring beam 316, a right side leash line orifice half 352, a right side housing handle half 304, and an axle slot (not shown but similar to slot 124 of the first embodiment) for attachment of the inner end of spring 348.

The left side housing 336 includes a left side housing handle half 332, a left side brake control guide 334, a left side leash line orifice half 354, a left side axle support 338 and a hole (not shown) opposite to the right side brake locking pin hole 312.

The leash line reel 306 includes a right sidewall 309 and a left sidewall 307, momentary/maximum extension brake teeth 310 and reel slots 358, each having at least a partially open internal edge, formed thereinbetween the teeth 310, positioned on both the right sidewall 309 and the left sidewall 307, a reel axle hole 308, a leash line reel hub 360, (see FIG. 25), positioned thereinbetween the right sidewall 309 and the left sidewall 307 in which the leash line 350 winds thereupon and a reel spring recess (not shown) similar to the recess 163 for housing the spring 348.

The combination momentary and maximum extension brake control 322 includes a momentary brake stop 320, a momentary brake stop 326, a maximum extension brake lock post 324 and a maximum extension brake female ramp 342.

The maximum extension brake locking pin 330 includes a guide flange 340 and a brake pin locking post 328.

The maximum extension brake assembly 344 includes a maximum extension brake engagement component 374, a maximum extension brake enablement component 362 and a maximum extension brake spring 364. The brake engagement component 374 includes a linear ramp 372, a linear ramp 366, an elongated axle hole 370, a maximum extension brake shaft or leash line arresting member 378 and a leash line retaining shaft 376. The brake enablement component 362 includes a linear ramp 380, a linear ramp 382, a circular axle hole 368 and a circular male ramp 356.

Referring to FIG. 23, a right side perspective view of the third embodiment 300 shows the leash line 350 partially extended; the leash line reel 306 and the brake engagement component 374 disengaged from each other; and the combination momentary and maximum extension brake control 322 in a generally radial outward position, with the right side housing 302 removed.

When the combination momentary and maximum extension brake control 322 is in the outward position shown, the brake engagement component 374 is disengaged from the leash line reel 306, since the leash line arresting member 378 and the leash line retaining shaft 376 are not within reel slots 358 (For reference, see FIG. 25 and FIG. 26 which shows the shaft 376 and arresting member 378 within the reel slots 358). Note that the leash line 350 passes between the leash line arresting member 378 and the leash line retaining shaft 376 and then through the left side leash line orifice half 354. The locking pin guide 340 (not shown), the locking pin 330 and the brake locking post 324 have the same configuration and function as with the corresponding components in the second embodiment 200 in that they serve to lock the combination momentary and maximum extension brake control 322 in an intermediate inward position. The brake control spring 318 has the same function as the corresponding spring 232 in the second embodiment 200 in that it returns the brake control 322 to an outward position when not being pressed.

Also note, the momentary brake is disabled since the momentary brake stop 320 and the momentary brake stop 326 are disengaged from the corresponding brake teeth 310, (For reference, see FIG. 27 and FIG. 28 which slows stops 320 and 326 engaged with the teeth 310).

Referring to FIG. 24, a left side perspective view of the third embodiment 300 shows the leash line 350 partially extended; the brake engagement component 374 disengaged from the leash line reel 306 (as in FIG. 23); and the combination momentary and maximum extension brake control 322 in a generally radial outward position, with the right side housing 302 and left side housing 336 removed. Note that the maximum extension brake enablement component 362 incorporates a circular male ramp 356 on its left side.

Referring to FIG. 25, a right side perspective view of the third embodiment 300 shows the leash line 350 extended to its maximum set length; the leash line arresting member 378 and the leash line retaining shaft 376 positioned within a reel slot 358 of the leash line reel 306; and the combination momentary and maximum extension brake control 322 positioned in an generally radial intermediate inward position, with the right side housing 302 removed. Also shown is a cutout 386 of reel 306 displaying the relative positions of the reel spring 348, a reel hub 360 and the winding of the leash line 350 thereon the reel hub 360.

When the combination momentary and maximum extension brake control 322 is in the intermediate inward position shown, the leash line arresting member 378 is engaged with the leash line reel 306, since the arresting member 378 and the leash line retaining shaft 376 are positioned within the corresponding reel slots 358.

Referring to FIG. 29 and FIG. 30, a side perspective view of the maximum extension brake assembly 344 of the third embodiment 300 shows an expanded state and a retracted state, respectively with all other components removed. Since the brake engagement component 374 is constrained from axial movement by the reel 306, then when the female ramp 342 acts on the circular male ramp 356, the brake assembly 344 contracts due to the maximum extension brake enablement component 362 being forced to move axially closer to the maximum extension brake engagement component 374. When this axial movement occurs, ramp 380 acts on ramp 372 and ramp 382 acts on ramp 366 causing the brake engagement component 374 to move inward toward brake enablement component 362, thereby compressing spring 364. Note, the spring 364 maintains the brake assembly 344 in an expanded state when the brake assembly 344 is not being acted on by the movement of the female ramp 342. Also note that the extension brake enablement component 362 is constrained from movement by the reel axle acting on the circular axle hole 368 but the brake engagement component 374 is not constrained from movement by the elongated axle hole 370.

Referring to FIG. 25, as the control 322 is pushed inward towards its intermediate position, the female ramp 342 contacts the circular male ramp 356 and forces the maximum extension brake enablement component 362 axially inward which in-turn causes the brake engagement component 374 to move inward, thereby positioning the leash line arresting member 378 and the leash line retaining shaft 376 within corresponding reel slots 358, as the leash line 350 is slightly extended or retracted. And thus, the arresting member 378 is engaged with the reel 306. Note that when the control 322 is maintained in its intermediate inward position, the momentary brake is disengaged since the momentary brake stop 320 and the momentary brake stop 326 are disengaged from the corresponding brake teeth 310.

With the arresting member 378 is engaged with the reel 306, the maximum extension brake is enabled. Note in FIG. 25 that when the set leash line 350 maximum extension length is reached, the leash line 350 engages with the arresting member 378 and the arresting member 378 in-turn contacts the respective teeth 310 and prevents the reel 306 from further clockwise rotation, thus restricting the leash line 350 from further extension (although very slight further rotation of the leash line reel 306 and leash line 350 extension can occur due to flexure and stretching of related materials and components under load). Note when the leash line 350 is at the set leash line 350 maximum extension length, the leash line 350 can fully retract and extend repeatedly up to the maximum extension length, as with the first embodiment 100 and the second embodiment 200.

When the maximum extension brake locking pin 330 is pushed inward, the brake pin locking post 328 contacts the corresponding maximum extension brake locking post 324 and retains the brake control 322 in an intermediate inward position thus, maintaining the reel 306 and the brake engagement component 374 in a locked together state.

Note that the maximum extension brake in the first embodiment 100, the second embodiment 200 and the third embodiment 300 are accomplished in essentially the same manner by an arresting member engaged with the reel and crossing the leash line thereinbetween the hub of the reel and the leash line housing orifice. The leash line arresting member could be of any configuration, either simple or complex, such as a shaft, bar, plate, beam, channel, tube, cylinder and the like. Also note that the leash line tensile load is solely carried by the leash line arresting member and associated leash line reel.

Referring to FIG. 26, a left side perspective view of the third embodiment 300 shows the leash line 350 extended to its maximum set length; the leash line arresting member 378 is engaged with the leash line reel 306; and the combination momentary and maximum extension brake control 322 in a generally radial intermediate inward position, with the right side housing 302 and left side housing 336 removed. Note that the brake control 322 has moved inward and is covering in-part the circular male ramp 356, thereby, forcing the brake enablement component 362 axially inward which in-turn causes the brake engagement component 374 to move inward.

Referring to FIG. 27, a right side perspective view of the third embodiment 300 shows the leash line 350 partially extended; the leash line arresting member 378 engaged with the leash line reel 306; the combination momentary and maximum extension brake control 322 in a generally radial inner most position; the momentary brake enabled via momentary brake stop 320 and the momentary brake stop 326 engaged with the corresponding brake tooth 310, with the right side housing 302 removed. Note that the leash line 350 wraps over the retaining shaft 376 as the leash line 350 is retracted back from leash line maximum extension.

Referring to FIG. 28, a left side perspective view of the third embodiment 300 shows the leash line 350 partially extended; the leash line arresting member 378 engaged with the leash line reel 306; the combination momentary and maximum extension brake control 322 in a generally radial inner most position; the momentary brake enabled via momentary brake stop 320 and the momentary brake stop 326 engaged with the corresponding brake teeth 310, with the right side housing 302 and left side housing 336 removed. With respect to FIG. 28, note that the brake control 322 has moved further over the circular male ramp 356 but since the circular female ramp 342 has moved beyond the male ramp 356, there is no more additional force acting on the brake enablement component 362 causing it to move further axially inward.

Operation of the Third Embodiment—FIG. 23 Through FIG. 30

To operate the third embodiment of the disclosed invention, a user holds the retractable leash device 300 by the handle formed by the combination of right side housing handle half 304 and the left side housing handle half 332 upon assembly of the third embodiment 300 and sets the leash line 350 maximum extension length from an existing maximum extension length to a new maximum extension length. To set a new maximum extension length from a previous maximum extension length setting, the following steps are performed: (1) the leash line 350 is extended until the existing maximum extension length is reached, (2) the brake locking pin 330 is pushed until the brake pin locking post 328 disengages with the maximum extension brake lock post 324 which permits the combination momentary and maximum extension brake control 322 to move from its intermediate inward position to its outer position via the force provided by the brake control spring 318. This in-turn results in the disengagement of the leash line arresting member 378 from the leash line reel 306, (3) with the leash line arresting member 378 disengaged from the leash line reel 306, the leash line 350 is either extended or retracted until the desired maximum extension length is reached, (4) the brake control 322 is then pushed inward as the leash line 350 is slightly extended or retracted until the leash line arresting member 378 engages with the respective brake teeth 310 of the reel 306 and (4) with the brake control 322 held inward, the brake locking pin 330 is pushed inward until the brake pin locking post 328 engages with the maximum extension brake lock post 324. The new maximum extension leash line length is now set and the leash line 350 is then allowed to fully or partially extend or retract, as desired.

The new leash line 350 maximum extension length has now been set allowing the leash line 350 to fully extend to the new maximum extension length and fully retract repeatedly. With this new maximum extension length established, the connector 106 can be connected to the animal's collar or other restraining equipment. Note that the above maximum extension length re-setting steps can be performed with the leash line 350 attached to the animal.

While using the retractable leash device with a maximum leash line 350 length established, the momentary brake can be employed in an emergency, by pressing the brake control 322 to its inner most position, to keep the associated animal at a safe distance and then the brake control 322 released when the emergency has passed to return the third embodiment 300 to the set leash line 350 maximum extension length and automatic full retraction capability.

Fourth Embodiment—FIG. 1, FIG. 2, FIG. 5, FIG. 6, FIG. 7, FIG. 8, FIG. 9, FIG. 10, FIG. 11, FIG. 12, FIG. 13, FIG. 14, FIG. 15, FIG. 16 FIG. 17, FIG. 18, FIG. 21, FIG. 22, FIG. 23, FIG. 24, FIG. 25, FIG. 26, FIG. 29 and FIG. 30

Also disclosed herein is a method for controlling an animal by its keeper using a retractable leash device having a multitude of setable maximum leash extensions therefrom the device while providing complete leash retraction thereinto the device at each set maximum leash extension length, comprising the steps of (a). providing a retractable leash device including a leash line 108, 212, 350; a reel 134, 224, 306, including a hub 360 or similar; a housing 102/104, 202/210, 302/336 including a leash outlet aperture 166/168, 274/276, 352/354; an axle 126, 268, typical on 300; a spring 160, 264, 348; a maximum extension brake 154, 154A, 154B, 230, 344, including leash line arresting member 156, 156A, 156B, 254, 378; and a maximum extension brake control 111, 206, 322, wherein (1) the leash is wound, in part, thereupon the hub and exiting the housing through the aperture, (2) the leash being operable to connect to the animal, (3) the reel being mounted therewithin the housing on the axle and biased by the spring to retract the leash line thereon the reel, (4) the maximum extension brake being engageable therewith the reel; the leash line arresting member positioned to cross the leash line, at least in part, thereinbetween the hub and the aperture and further, (5) upon engagement of the brake with the reel and extension of the leash line, an eventual interaction of the leash line arresting member with the leash line prevents further extension of the leash line and finally, the brake control communicating with the maximum extension brake to engage and disengage the brake from the reel upon keeper interaction of the brake control;

(b). extending the leash therefrom the device until the existing maximum leash line extension is obtained;

(c). actuating the maximum extension brake control to disengage the maximum extension brake from the reel;

(d). extending or retracting the leash line to the desired maximum extension length to ensure proper control of the animal; and (e). actuating the maximum extension brake control to engage the maximum extension brake therewith the reel.

Advantages of the Embodiments

From the descriptions above, a number of possible advantages of my retractable leash device and method therefor become evident.
- (a). The retractable leash device can be set to a multitude of maximum leash line extension lengths.
- (b). The retractable leash device provides full repeated leash line extension and retraction when set at any maximum leash line extension length.
- (c). The retractable leash device provides a momentary leash line brake.
- (d). The retractable leash device part count is significantly less than the prior art leashes having settable maximum leash line extensions with corresponding leash line retraction.
- (e). The retractable leash device does not use gears and/or complex linkages to coordinate reel rotation with the maximum extension leash line length, as with the prior art.
- (f). When at its maximum extension length, the leash line's tensile load is carried directly by the interaction of the maximum extension brake and the reel.
- (g). The retractable leash device enhances operator safety since the leash line is fully extendable and retractable when set at any maximum leash line extension length.
- (h). The retractable leash device significantly reduces leash line entanglement since the leash line is always maintained taut.
- (i). The momentary brake on the retractable leash device can be locked in an on state.
- (j). Due to its simplicity, the retractable leash device is approximately the same size as conventional retractable leashes that do not retract when the brake is set.

CONCLUSION, RAMIFICATIONS, AND SCOPE

Thus, a person of ordinary skill in the art will understand that the retractable leash device and method therefor is novel, simple, user friendly, inexpensive, as well as reliable and has many advantages, features, and benefits over the prior art. Furthermore, it will be readily apparent to one skilled in the art that the retractable leash device and method therefor of this application are essential for significantly reducing the stress, effort, and time involved in undoing leash line entanglement with the leashed animal and/or adjacent objects while at the same time enhancing operator safety by eliminating the operator's tendency to handle the leash line in an effort to keep it taut. In addition, it should be evident that the simple retractable leash device design that incorporates a leash line arresting member interacting with the leash line reel and the leash line in such a manner so as to limit maximum leash line extension while permitting full repeated leash line extension and retraction at a multitude of possible maximum leash extension settings, is truly unique. Moreover, the retractable leash device and method therefor may have one or more of the following additional advantages.

The retractable leash device may be more compact, as compared to the prior art leashes, stated in the Background section, due to its smaller part count.

The retractable leash device may have a higher resistance to malfunction due to its lower part count, as compared to leashes stated in the Background section.

The retractable leash device is simple in design and therefore, maybe inexpensive, as compared to prior art leashes stated in the Background section.

The retractable leash device is easy to use.

The retractable leash device is user friendly.

The retractable leash device is reliable, due to its simple design.

While the above description contains many specifics, these specifics should not be construed as limitations on the scope of the disclosed invention, but rather as an exemplification of several preferred embodiments thereof. It should be noted that when the adjective and adverb words such as general, generally, substantial, substantially, radial, radially, axial, axially and maximum are used in the forgoing specification and forthcoming claims, they should be taken to mean not necessarily exact but also, with significant variance with respect to the absolute. It should also be noted that the retractable leash device disclosed herein can be used to control small children, as well as animals and on other applications where retractable reel assemblies are used such as to retract hoses, electrical cords, rope, cable and the like.

Many other ramifications, variations, alterations, substitutions, modifications, and the like are readily possible. For example, sizes, shapes, materials, assembly, design, etc. of all parts can be readily modified, altered or changed.

The leash line arresting members 156, 156A and 156B can be made of a different material than the main body of the maximum extension brakes 154, 154A and 154B. The cantilever springs or resilient biasing components 152, 152A, 152B, 154C and 154D can be of a different material than the body of the maximum extension brakes 154, 154A and 154B such as spring type metal and can be of a different spring configuration rather than cantilevered. The cantilevered springs or resilient biasing components 152, 152A, 152B, 152C and 152D can be replaced by any biasing component or component mechanism/assembly that retains arresting members 156, 156A, and 156B in the appropriate slots 162 until brake 154 154A and 154B are acted on by control shaft 110. For example, the cantilevered springs or resilient biasing components 152, 152A, 152B, 152C and 152D could be replaced with other resilient components or related resilient components such as a torsion spring attached to brake 154, 154A and 154B and biased against a portion of housing 102 or collar 176, a spring biased pivoting arm contactable with collar 176 or another portion of housing 102, a compression spring biased slideable shaft contactable with collar 176 or another portion of housing 102, a spring tensioned strap or cord contactable with collar 176 or another portion of housing 102, any spring or spring mechanism/assembly that biases the brakes 154, 154A and 154B against the housings 102 and/or 104, an elastic/resilient pad/component or other elastic/resilient geometric member affixed to the brakes 154, 154A and 154B that interacts with the collar 176 or other portion of housing 102 and/or housing 104. Also for example, the cantilevered spring or resilient biasing components 152, 152A, 152B, 152C and 152D could be eliminated and a spring, spring mechanism/assembly or an elastic/resilient material (resilient biasing component(s)) positioned in or around the area 169 (See FIG. 9) of the housing 102 and/or housing 104 to bias brakes 154, 154A and 154B and thereby retaining arresting members 156, 156A, and 156B in the appropriate slots 162 until brakes 154, 154A and 154B are acted on by control shaft 110. As an additional example, a magnetic biasing component or magnetic component mechanism/assembly using a magnet(s) and/or magnetic material(s) combination could be incorporated that retains arresting members 156, 156A, and 156B in the appropriate slots 162 until brake 154, 154A and 154B are acted on by control shaft 110. Furthermore, the springs or resilient biasing components 152, 152A, 152B, 152C and 152D could be eliminated and the slots 162 either having or being in association with a catch, latch, bowed leaf spring, etc. or otherwise a restriction near their open end to prevent arresting members 156, 156A, and 156B from exiting the applicable slots 162 until brakes 154, 154A and 154B are acted on by control shaft 110. Also, if the springs or resilient biasing components 152, 152A, 152B, 152C and 152D are eliminated, as previously stated, the housing 102 and/or brakes 154, 154A and 154B could have a catch, latch, post or other geometric structure such that when connected together, the corresponding arresting members 156, 156A, and 156B are maintained out of the reel slots 162, such as with brake slot 186 and housing post 188 and further, the upper end of openings 170, 170A and 170B would have to be closed internal edge openings so that shaft 110 could engage therewith and force brakes 154, 154A and 154B into the related slots 162. The function of the control maximum extension brake control 111 can be moved near or closer to the brake control 120, either on the top or side of housing 102 and/or 104, and thumb or finger actuated with proper linkage connecting to the maximum extension brakes 154, 154A and 154B. The momentary brake stops 142 and 143 could be spring biased and pivot with respect to the main body of the momentary brake control 120, so as to form pawls and ratchet against the momentary brake teeth 136 and allow the reel 134 to retract the leash line 108 when the momentary brake is engaged. Rather than the momentary brake control 120 being thumb actuated, the brake control 120 could be actuated via a squeezable lever or other operator moveable control on or near the handle 122/130 with appropriate linkage. Rather than operate the momentary brake locking pin 118 by pushing it in and out of the housings 102 and 104, a thumb actuated control could be located on or near the handle 122/130 or combined with the momentary brake control 120, with proper linkage, to engage with the brake control 120, thereby locking the momentary brake. The leash line 108 could be of any suitable flexible material or shape, such as strap, cable, cord, rope, twine, ribbon, string, hose, plastic, metal, cotton, fiber, elastic material, linked assembly, and the like. The leash line 108 can have a cross section of any shape, either constant or variable, such as round, square, rectangular, triangular, elliptical and the like. The momentary brake locking pin 118 can be other than a pin configuration; can slide other than in the left-right direction with respect to the housings 102 and 104; and can pivot or rotate rather than slide. The wall surfaces of slots 162 do not have to be parallel as shown in FIG. 2 thru FIG. 7 but can be non-parallel or angled as well as closer together or farther away, with respect to each other and further, in any case collectively associated with inwardly extending open ended slots. The slots 162 can be either linear as shown, piecewise linear, angled and/or curved. Reel 134 can function with only one sidewall. Axle 126 could be either integrated into housing 102 and/or housing 104 or an independent component supported by housing 102 and/or housing 104. Housings 102 and 104 each provide for essentially half of the first embodiment 100 overall housing, as shown, but could be reconfigured so that each provide for a different housing percentage, for example 70 percent and 30 percent. Collectively, housings 102 and 104 provide for essentially a full enclosure of the first embodiment 100, but could be reconfigured to provide only a partial enclosure of the first embodiment 100, mainly support for the reel 134, the brakes 154, 154A and 154B, the momentary brake control 120 and the leash line aperture 166/168, as a minimum. The maximum extension brake control 111 could be eliminated and the brakes 154, 154A and 154B engaged and disengaged with a finger passing through an appropriate cutout in housing 102 and contacting brakes 154, 154A and 154B directly for related engagement and disengagement. The brakes 154, 154A and 154B and reel 134 could have connectable engagement structure other than arresting members 156, 156A, and 156B being positioned within reel slots 162 and therefore, 108B contact could still occur with the arresting members 156, 156A, and 156B being out of reel slots 162 thus, establishing a maximum extension leash line 108 length. Also, the brakes 154, 154A and 154B and reel 134 could have connectable engagement structure other than using arresting members 156, 156A, and 156B by brakes 154, 154A and 154B having an additional post or boss insertable into a slots 162 in reel sidewall 137. The post 188 and corresponding slot 186 could be of different configurations. The opening 170 could be replaced with a boss or raised portion emanating from brakes 154, 154A and 154B engageable with control shaft 110.

The momentary brake stops 234 and 236 could pivot with respect to the main body of the combination momentary and maximum extension brake control 206, so as to ratchet against the momentary brake teeth 222 and 252, respectively and allow the reel 224 to retract the leash line 212 when the momentary brake is engaged. Rather than the combination momentary and maximum extension brake control 206 being thumb actuated, the brake control 206 could be actuated via a squeezable lever or other operator moveable control on or near the handle 204/242 with appropriate linkage. Rather than operate the momentary brake locking pin 208 by pushing it in and out of the housings 202 and 210, a thumb actuated control could be located on or near the handle 204/242, or combined with the combination momentary and maximum extension brake control 206, with proper linkage, to engage with the combination momentary and maximum extension brake control 206 thereby, locking the momentary brake in an on state. The leash line 212 could be of any suitable flexible material or shape, such as strap, cable, cord, rope, twine, string, ribbon, hose, plastic, elastic material, metal, cotton, fiber, linked assembly, and the like. The leash line 212 can have a cross section of any shape, either constant or variable, such as round, square, rectangular, triangular, elliptical and the like. The maximum extension brake locking pin 208 can be other than a pin configuration; can slide other than the left-right direction with respect to the housings 202 and 210; and can pivot or rotate rather than slide. Axle 268 could be either integrated into housing 202 and/or housing 210 or be an independent component supported by housing 202 and/or housing 210. Housings 202 and 210 each provide for essentially half of the second embodiment 200 housing, as shown, but could be reconfigured so that each provide for a different housing percentage, for example 70 percent and 30 percent. Collectively, housings 202 and 210 provide for essentially a full enclosure of the second embodiment 200, but could be reconfigured to provide only a partial enclosure of the second embodiment 200, mainly support for the reel 224, the brake 230, the combination momentary and maximum extension brake control 206 and the leash line aperture 274/276, as a minimum. The combination momentary and maximum extension brake control 206 could be split into two separate functions, namely a momentary brake control which could function similar to the momentary brake control 120 and a maximum extension brake control having a slideable ramp based button, a push in latching button or a cam based pivoting toggle button to push the maximum extension brake 230 in to engage the brake 230 with the reel 224 and to disengage the brake 230 from the reel 224. Reel 224 can function with only one sidewall. Instead of the engagement cogs 228 being a part of the leash line arresting member 254 they can be positioned on the maximum extension brake 230 to engage with corresponding slots in sidewall 226 or cogs 228 being positioned on sidewall 226 and engageable with corresponding slots in brake 230. In the case where the engagement cogs 228 are not a part of the leash line arresting member 254, the leash line arresting member 254 can still have non-engagement cogs and the right sidewall 227 can still have corresponding slots for the non-engagement cogs to enter to maintain the leash line 212 thereon reel 224. The engagement slots 220 do not have to have closed internal edges, as shown, but could have partially open internal edges opening thereinto the periphery of sidewall 227. Note that the combination momentary and maximum extension brake control 206 can be more simply referred to as a maximum extension brake control 206 since it combines both the functions of a momentary brake and a brake control.

The leash line arresting member 378 and a leash line retaining shaft 376 can be made of a different material than the main body of the brake engagement component 374. The momentary brake stops 320 and 326 could pivot with respect to the main body of the combination momentary and maximum extension brake control 322, so as to ratchet against the momentary brake teeth 310 and allow the reel 306 to retract the leash line 350 when the momentary brake is engaged. Rather than the combination momentary and maximum extension brake control 322 being thumb actuated, the brake control 322 could be actuated via a squeezable lever or other operator moveable control on or near the handle 304/332 with appropriate linkage. Rather than operate the momentary brake locking pin 330 by pushing it in and out of the housings 302 and 336, a thumb actuated control could be located on or near the handle 304/332 or combined with the combination momentary and maximum extension brake control 322, with proper linkage, to engage with the brake control 322, thereby locking the momentary brake in an on state. The leash line 350 could be of any suitable flexible material or shape, such as strap, cable, cord, rope, twine, string, ribbon, hose, plastic, metal, cotton, fiber, elastic material, linked assembly, and the like. The leash line 350 can have a cross section of any shape, either constant or variable, such as round, square, rectangular, triangular, elliptical and the like. The maximum extension brake locking pin 330 can be other than a pin configuration; can slide other than the left-right direction with respect to the housings 302 and 336; and can pivot or rotate rather than slide. The wall surfaces of slots 358 can be either parallel or non-parallel or angled as well as closer together or farther away, with respect to each other and further, in any case collectively associated with inwardly extending open ended slots. The wall surfaces of slots 358 can be either linear, piecewise linear, angled and/or curved. The reel 306 can function with only one sidewall. Housings 302 and 336 each provide for essentially half of the third embodiment 300 housing, as shown, but could be reconfigured so that each provide for a different housing percentage, for example 70 percent and 30 percent. Collectively, housings 302 and 336 provide for essentially a full enclosure of the third embodiment 300, but could be reconfigured to provide only a partial enclosure of the third embodiment 300, mainly support for the reel 306, the, the combination momentary and maximum extension brake control 322 and the leash line aperture 352/354, as a minimum. The combination momentary and maximum extension brake control 322 could be split into two separate functions, namely a momentary brake control which could function similar to the momentary brake control 120 and a maximum extension brake control having a slideable ramp based button, a push in latching button or a cam based pivoting toggle button to push the brake assembly 344 in to engage the brake assembly 344 with the reel 306 and to disengage the brake assembly 344 from the reel 306.

Accordingly, the scope and meaning should be determined not only by the embodiments illustrated herein, but by the appended claims and their legal equivalents.

I claim:

1. A retractable leash device for control of an animal comprising:
   a leash line,
   a reel, said reel having at least one sidewall and a hub, said hub affixed to said at least one sidewall
   a housing, said housing including a leash line outlet aperture,
   an axle, said axle supported by said housing,
   a spring,
   a maximum extension brake, said brake including a leash line arresting member,
   a maximum extension brake control,
   said leash line having a wound portion and an unwound portion, said wound portion being wound on said reel about said hub, said unwound portion extending away from said wound portion and exiting said housing through said aperture, said leash line being operable to connect to the animal,
   said reel being rotatably mounted within said housing on said axle and further, said reel being biased by said spring to wind said leash line on said reel, thereby, retracting said leash line,
   said maximum extension brake being rotatable about said axle and translatable alternately toward and away from said hub, said maximum extension brake positioned adjacent to said reel,
   said leash line arresting member of said maximum extension brake crossing said leash line at a position between said hub and said aperture, and
   is translatable to engage with said reel to lock said maximum extension brake to said reel, thereby being rotatable in unison with said reel about said axle, and further, upon engagement of said leash line arresting member of said maximum extension brake with said reel and extension of said leash line, a direct interaction between said leash line arresting member of said maximum extension brake and said unwound portion of said leash line independently prevents both further rotation of said reel and corresponding extension of said leash line, thereby establishing a maximum leash line extension, and wherein upon retraction of said leash line, said leash line winds on said reel over said engaged leash line arresting member of said maximum extension brake,
   said maximum extension brake control being engageable with said maximum extension brake wherein said brake is translationally moved, at least in part by said brake control engaged with said brake, to alternately position said leash line arresting member of said maximum extension brake into said engagement with and disengagement from said reel;
   whereby, the retractable leash device can be set to a multitude of leash line maximum extension lengths, as determined by the length of said leash line extended from said reel when said leash line arresting member of said maximum extension brake interacts with said leash line and provide complete leash line retraction and extension at each set maximum extension length, thereby enhancing control of the animal connected to the device.

2. The device as defined in claim 1 wherein said reel has two sidewalls and said hub is positioned between said two sidewalls and
wherein at least one of said two sidewalls has a thickness and both an outer periphery and at least one slot and wherein said at least one slot being through said thickness and having at least a partially open internal edge, said edge opening into said periphery and further,
wherein said maximum extension brake is translationally moved, at least in part by said maximum extension brake control engaged with said brake, non-axially to position said leash line arresting member of said maximum extension brake into said at least one slot to establish said engagement and removed from said at least one slot non-axially, to establish said disengagement.

3. The device as defined in claim 1 wherein said reel has two sidewalls and said hub is positioned between said two sidewalls,
wherein one of said two sidewalls has at least one slot and
wherein said leash line arresting member of said maximum extension brake has at least one cog and further,
wherein said brake is translationally moved, at least in part by said maximum extension brake control engaged with said brake, substantially axially to position said at least one cog of said arresting member into said at least one slot to establish said engagement and removed substantially axially from said at least one slot to establish said disengagement.

4. The device as defined in claim 3 wherein the device further includes a maximum extension brake locking component communicating with said housing,
said maximum extension brake locking component constructed and arranged to engage, upon operator interaction, with said maximum extension brake control, to lock said maximum extension brake control in position to maintain said engagement without further operator input.

5. The device as defined in claim 3 wherein at least one of
said two sidewalls has both an outer periphery and a plurality of spaced brake teeth positioned adjacent to said periphery and
wherein said maximum extension brake control further includes at least one brake stop and further,
wherein said at least one brake stop is translationally moved, by said maximum extension brake control, into and from the rotational path of said brake teeth to engage and to disengage, respectively said maximum extension brake control with and from said reel, respectively,
whereby, said maximum extension brake control also serves as a momentary brake control thereby, incorporating a momentary brake feature into the device.

6. The device as defined in claim 1 further including a momentary brake control, said momentary brake control constructed and arranged to moveably communicate with said housing and further, having at least one brake stop and
wherein said reel has two sidewalls and said hub is positioned between said two sidewalls and at least one sidewall of said two sidewalls has both an outer periphery and a plurality of spaced brake teeth adjacent to said periphery and further,
wherein said at least one brake stop is translationally moved, by operator interaction with said momentary brake control into and from the rotational path of said brake teeth to engage and to disengage, respectively said momentary brake control with and from said reel, respectively,
whereby, a momentary brake feature is incorporated into the device.

7. The device as defined in claim 6 further including a momentary brake locking component communicating with said housing,
said momentary brake locking component constructed and arranged to engage, upon operator interaction, with said momentary brake control, to lock said momentary brake control engaged with said reel by maintaining said at least one brake stop within said rotational path of said brake teeth without further operator input.

8. The device as defined in claim 1 wherein said housing further includes a handle configured for operator holding of the device and
wherein said leash line has an end portion outside of said housing and wherein a connector is attached to said end portion of said leash line for securing said leash line to an animal restraint apparatus worn by the animal.

9. A retractable leash device for control of an animal comprising:
a leash line,
a reel, said reel having two sidewalls and a hub affixed between said two sidewalls,
a housing, said housing having a leash line outlet aperture and supporting an axle,
a spring,
a maximum extension brake, said brake including a leash line arresting member,
a maximum extension brake control,
said leash line, having a wound portion and an unwound portion, said wound portion being wound on said reel about said hub, said unwound portion extending away from said wound portion and exiting said housing through said aperture, said leash line being operable to connect to the animal,
said reel being rotateably mounted on said axle and enclosed within said housing and further, said reel being biased by said spring to wind said leash line on said reel, thereby, retracting said leash line,
each of said two sidewalls having a thickness and both an outer periphery and at least one slot, said at least one slot being through said thickness and having at least a partially open internal edge, said partially open internal edge opening into said periphery,
said maximum extension brake being rotatable about said axle and translatable alternately toward and away from said hub, said maximum extension brake positioned adjacent to one of said two sidewalls,
said leash line arresting member of said maximum extension brake crossing said leash line at a position between said hub and said aperture, and is translatable to engage with said at least one slot to lock said maximum extension brake to said reel, thereby being rotatable in unison with said reel about said axle and further, upon engagement of said leash line arresting member of said maximum extension brake with said at least one slot and extension of said leash line, a direct interaction between said leash line arresting member of said maximum extension brake and said unwound portion of said leash line independently prevents both further rotation of said reel and corresponding extension of said leash line, thereby establishing a maximum leash line extension and wherein upon retraction of said leash line, said leash line winds on said reel over said engaged arresting member of said maximum extension brake, said maximum extension brake control being engageable with said maximum extension brake wherein said brake is translationally moved, at least in part by said brake control engaged with said brake, to alternately position said leash line arresting member of said maximum extension brake into said engagement with and disengagement from said at least one slot;

whereby, the retractable leash device can be set to a multitude of leash line maximum extension lengths, as determined by the length of said leash line extended from said reel when said leash line arresting member of said maximum extension brake interacts with said leash line, and provide complete leash line retraction and extension at each set maximum length, thereby enhancing control of the animal connected to the device.

10. The device as defined in claim 9 wherein the device further includes a momentary brake control, said momentary brake control constructed and arranged to moveably communicate with said housing and further, having at least one brake stop and wherein at least one sidewall of said two sidewalls has a plurality of spaced brake teeth adjacent to said periphery and further, wherein said at least one brake stop is translationally moved, by operator interaction with said momentary brake control, into and from the rotational path of said brake teeth to engage said momentary brake control with said reel to prevent further leash line extension and to disengage said momentary brake control from said reel permitting said leash line extension, respectively, whereby, a momentary brake feature is incorporated into the device.

11. The device as defined in claim 10 wherein the device further includes a momentary brake locking component communicating with said housing, said momentary brake locking component constructed and arranged to engage, upon operator interaction, with said momentary brake control, to lock said momentary brake control engaged with said reel by maintaining, without further operator input, said at least one brake stop within said rotational path of said brake teeth.

12. The device as defined in claim 9 wherein said maximum extension brake one of includes at least one resilient biasing component on said brake and interacts with at least one resilient biasing component adjacent to said brake to maintain said engagement until said arresting member of said maximum extension brake is disengaged from said reel by interaction of said brake control on said brake.

13. The device as defined in claim 9 wherein said housing further includes a handle configured for operator holding of the device and wherein said leash line has an end portion outside of said housing and wherein a connector is attached to said end portion of said leash line for securing said leash line to an animal restraint apparatus worn by the animal.

14. A method for controlling an animal by its keeper, the method comprising the steps of:

(a). providing a retractable leash device for control of an animal including:
a leash line,
a reel, said reel having at least one sidewall and a hub, said hub affixed to said at least one sidewall,
a housing, said housing including a leash line outlet aperture,
an axle, said axle supported by said housing,
a spring,
a maximum extension brake, said brake including a leash line arresting member,
a maximum extension brake control,
said leash line having a wound portion and an unwound portion, said wound portion being wound on said reel about said hub, said unwound portion extending away from said hub and exiting said housing through said aperture, said leash line being operable to connect to the animal,
said reel being rotatably mounted within said housing on said axle and further, said reel being biased by said spring to wind said leash line on said reel, thereby, retracting said leash line,
said maximum extension brake being rotatable about said axle and translatable alternately toward and away from said hub, said maximum extension brake positioned adjacent to said reel,
said leash line arresting member of said maximum extension brake crossing said leash line at a position between said hub and said aperture, and
is translatable to engage with said reel to lock said maximum extension brake to said reel, thereby being rotatable in unison with said reel about said axle, and further, upon engagement of said leash line arresting member of said maximum extension brake with said reel and extension of said leash line, a direct interaction between said leash line arresting member of said maximum extension brake and said unwound portion of said leash line independently prevents both further rotation of said reel and corresponding extension of said leash line, thereby establishing a maximum leash line extension, and wherein upon retraction of said leash line, said leash line winds on said reel over said leash line arresting member of said maximum extension brake,
said maximum extension brake control being engageable with said maximum extension brake wherein said brake is translationally moved, at least in part by said brake control engaged with said brake, to alternately position said leash line arresting member of said maximum extension brake into said engagement with and disengagement from said reel;

(b). extending said leash line from the device until the existing maximum leash line extension is attained;

(c). actuating said maximum extension brake control to at least initiate said disengagement of said arresting member of said maximum extension brake from said reel;

(d). performing one of extending and retracting said leash line to a desired maximum leash line extension length to ensure proper control of the animal; and (e). actuating said maximum extension brake control to at least initiate said engagement of said arresting member of said maximum extension brake with said reel;

whereby, said retractable leash device can be set to a multitude of leash line maximum extension lengths and provide complete leash line retraction and extension at each set maximum length, thereby enhancing control of the animal connected to the device.

15. The method as defined in claim 14 wherein said reel has two sidewalls and said hub is positioned between said two sidewalls and wherein at least one of said two sidewalls has a thickness and both an outer periphery and at least one slot, and wherein said at least one slot being through said thickness having at least a partially open internal edge, said edge opening into said periphery and further, wherein said maximum extension brake is translationally moved, at least in part by said maximum extension brake control engaged with said brake, non-axially to position said leash line arresting member of said maximum extension brake into said at least one slot to establish said engagement and removed from said at least one slot non-axially to establish said disengagement.

16. The method as defined in claim 14 wherein said reel has two sidewalls and said hub is positioned between said two sidewalls, wherein one of said two sidewalls has at least one slot and wherein said leash line arresting member of said maximum extension brake has at least one cog and further, wherein said maximum extension brake is translationally moved, at least in part by said maximum extension brake control engaged with said brake, substantially axially to position said at least one cog of said arresting member into said at least one slot to establish said engagement and removed substantially axially from said at least one slot to establish said disengagement and further, wherein the device further includes a maximum extension brake locking component communicating with said housing, said maximum extension brake locking component constructed and arranged to engage, upon keeper interaction, with said maximum extension brake control, to lock said maximum extension brake control in position to maintain said engagement without further keeper input.

17. The method as defined in claim 16 wherein at least one of said two sidewalls has both an outer periphery and a plurality of spaced brake teeth positioned adjacent to said periphery and wherein said maximum extension brake control further includes at least one brake stop and further, wherein said at least one brake stop is translationally moved, by said maximum extension brake control, into and from the rotational path of said brake teeth to engage and to disengage, respectively said maximum extension brake control with and from said reel, respectively, whereby, said maximum extension brake control also serves as a momentary brake control and thereby, incorporating a momentary brake feature into the device.

18. The method as defined in claim 14 further including a momentary brake control, said momentary brake control constructed and arranged to moveably communicate with said housing and further, having at least one brake stop and wherein said reel has two sidewalls and said hub is positioned between said two sidewalls and at least one sidewall of said two sidewalls has both an outer periphery and a plurality of spaced brake teeth adjacent to said periphery and further, wherein said at least one brake stop is translationally moved, by keeper interaction with said momentary brake control into and from the rotational path of said brake teeth to engage and to disengage, respectively said momentary brake control with and from said reel, respectively, whereby, a momentary brake feature is incorporated into the device.

19. The method as defined in claim 18 further including a momentary brake locking component communicating with said housing, said momentary brake locking component constructed and arranged to engage, upon keeper interaction with said momentary brake control, to lock said momentary brake control engaged with said reel by maintaining said at least one brake stop within said rotational path of said brake teeth without further keeper input.

20. The method as defined in claim 14 wherein said housing further includes a handle configured for keeper holding of the device and wherein said leash line has an end portion outside of said housing and wherein a connector is attached to said end portion of said leash line for securing said leash line to an animal restraint apparatus worn by the animal.

\* \* \* \* \*